(12) United States Patent
Nitto et al.

(10) Patent No.: US 9,023,975 B2
(45) Date of Patent: May 5, 2015

US009023975B2

(54) POLYAMIDE AND POLYAMIDE COMPOSITION

(75) Inventors: Yu Nitto, Tokyo (JP); Yasukazu Shikano, Tokyo (JP); Shinji Ieda, Tokyo (JP); Kazunori Terada, Tokyo (JP); Masaaki Aramaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 171 days.

(21) Appl. No.: 13/393,604

(22) PCT Filed: Sep. 7, 2010

(86) PCT No.: PCT/JP2010/065284
§ 371 (c)(1),
(2), (4) Date: Mar. 1, 2012

(87) PCT Pub. No.: WO2011/030742
PCT Pub. Date: Mar. 17, 2011

(65) Prior Publication Data
US 2012/0165466 A1    Jun. 28, 2012

(30) Foreign Application Priority Data
Sep. 11, 2009    (JP) .................. 2009-210853

(51) Int. Cl.
C08G 69/02    (2006.01)
C08G 69/26    (2006.01)
C08L 77/06    (2006.01)
C08K 3/00     (2006.01)

(52) U.S. Cl.
CPC .............. *C08G 69/265* (2013.01); *C08G 69/26* (2013.01); *C08K 3/00* (2013.01); *C08L 77/06* (2013.01)

(58) Field of Classification Search
USPC .................... 428/394, 395; 524/606; 525/418; 528/310
See application file for complete search history.

(56) References Cited

U.S. PATENT DOCUMENTS

| | | | |
|---|---|---|---|
| 4,471,088 A | 9/1984 | Chiba et al. | |
| 4,698,083 A | 10/1987 | Shioura et al. | |
| 4,759,784 A | 7/1988 | Shono et al. | |
| 5,378,800 A | 1/1995 | Mok et al. | |
| 5,780,534 A | 7/1998 | Kleiner et al. | |
| 5,965,689 A | 10/1999 | Koning et al. | |
| 6,121,388 A | 9/2000 | Umetsu et al. | |
| 6,133,406 A | 10/2000 | Kosaka et al. | |
| 6,172,178 B1 | 1/2001 | Koning et al. | |
| 6,297,345 B1 | 10/2001 | Okushita et al. | |
| 7,166,687 B2 | 1/2007 | Vanderbosch et al. | |
| 2002/0055589 A1 | 5/2002 | Matsuoka et al. | |
| 2002/0077403 A1 | 6/2002 | Gittinger et al. | |
| 2003/0045621 A1 | 3/2003 | Aramaki et al. | |
| 2004/0049006 A1* | 3/2004 | Aramaki et al. ............ 528/335 |
| 2004/0068090 A1 | 4/2004 | Ogawa et al. | |
| 2005/0113496 A1 | 5/2005 | Saga | |
| 2006/0142443 A1 | 6/2006 | Aramaki et al. | |
| 2006/0264542 A1 | 11/2006 | Schneider | |
| 2009/0069478 A1 | 3/2009 | Seki et al. | |
| 2009/0275682 A1 | 11/2009 | Furukawa et al. | |
| 2009/0281210 A1 | 11/2009 | Aramaki | |
| 2009/0302272 A1 | 12/2009 | Sakata et al. | |
| 2010/0098946 A1 | 4/2010 | Tashiro et al. | |
| 2010/0173139 A1 | 7/2010 | Miyoshi et al. | |
| 2011/0028614 A1 | 2/2011 | Shikano et al. | |

FOREIGN PATENT DOCUMENTS

| | | |
|---|---|---|
| CA | 2065640 | 10/1992 |
| EP | 0 699 708 | 3/1996 |
| JP | 58-002327 | 1/1983 |
| JP | 64-002131 | 1/1989 |
| JP | 03-059019 | 3/1991 |
| JP | 04-013300 | 1/1992 |
| JP | 04-032775 | 2/1992 |
| JP | 5-17413 | 1/1993 |
| JP | 5-125184 | 5/1993 |
| JP | 6-32980 | 2/1994 |
| JP | 6-503590 | 4/1994 |
| JP | 08-73720 | 3/1996 |
| JP | 8-503018 | 4/1996 |
| JP | 08-333511 | 12/1996 |
| JP | 9-12868 | 1/1997 |
| JP | 10-292113 | 11/1998 |
| JP | 11-512476 | 10/1999 |
| JP | 2000-336167 | 12/2000 |

(Continued)

OTHER PUBLICATIONS

U.S. Office Action issued with respect to related U.S. Appl. No. 13/393,299, dated Jun. 19, 2012.
U.S. Appl. No. 13/393,299, filed Feb. 29, 2012.
International Search report for PCT/JP2010/065408, mail date is Dec. 14, 2011.
International Preliminary Report on Patentability and Written Opinion for International Application No. PCT/JP2010/065408, mail date is Apr. 11, 2012.
International Search Report for PCT/JP2009/054693, mailed May 12, 2009.
International Preliminary Report on Patentability issued with respect to PCT/JP2009/054693, mailed Nov. 11, 2010.
Search report from International Application No. PCT/JP2010/065284, mail date is Nov. 2, 2010.

(Continued)

*Primary Examiner* — Gregory Listvoyb
(74) *Attorney, Agent, or Firm* — Grenblum & Bernstein, P.L.C.

(57) ABSTRACT

[Problem to be Solved]
To provide a polyamide having a high melting point, which has excellent strength, toughness, and stability under heating.
[Solution]
This polyamide is obtained by polymerizing an (a) dicarboxylic acid comprising at least 50 mol % of an alicyclic dicarboxylic acid and a (b) diamine comprising at least 50 mol % of a diamine having a pentamethylenediamine skeleton, wherein the polyamide has a cyclic amino end amount of 30 to 60μ equivalents/g.

12 Claims, No Drawings

(56) References Cited

FOREIGN PATENT DOCUMENTS

| | | |
|---|---|---|
| JP | 2001-514695 | 9/2001 |
| JP | 2002-097265 | 4/2002 |
| JP | 2002-309083 | 10/2002 |
| JP | 2003-2966 | 1/2003 |
| JP | 2003-119378 | 4/2003 |
| JP | 2003-138012 | 5/2003 |
| JP | 2003-292612 | 10/2003 |
| JP | 2003-292614 | 10/2003 |
| JP | 2004-75932 | 3/2004 |
| JP | 2004-149769 | 5/2004 |
| JP | 2004-211083 | 7/2004 |
| JP | 2004-075932 * | 11/2004 |
| JP | 2006-273945 | 10/2006 |
| JP | 2006-522842 | 10/2006 |
| JP | 2007-291250 | 11/2007 |
| JP | 2008-38125 | 2/2008 |
| JP | 2008-221574 | 9/2008 |
| JP | 2010-111843 | 5/2010 |
| JP | 2011-225830 | 11/2011 |
| KR | 10-2002-0008152 | 1/2002 |
| WO | 92/08754 | 5/1992 |
| WO | 94/11418 | 5/1994 |
| WO | 97/11108 | 3/1997 |
| WO | 00/58248 | 10/2000 |
| WO | 02/48239 | 6/2002 |
| WO | 2006/112205 | 10/2006 |
| WO | 2008/149862 | 12/2008 |
| WO | 2009/113590 | 9/2009 |
| WO | 2011/030742 | 3/2011 |

OTHER PUBLICATIONS

International Preliminary Report on Patentability and Written Opinion for International Application No. PCT/JP2010/065284, mail date is Apr. 11, 2012.
Korean Office action that issued with respect to Korean Patent Application No. 9-5-2012-010464251, mail date is Feb. 22, 2012.
Japanese Office action that issued with respect to Japanese Patent Application No. 2009-097477, mail date is Apr. 3, 2012.
Japanese Office action that issued with respect to Japanese Patent Application No. 2009-097479, mail date is Apr. 11, 2012.
US Office action that issued with respect to related U.S. Appl. No. 12/921,815, mail date is May 1, 2012.
US Office action that issued with respect to related U.S. Appl. No. 12/921,815, mail date is Oct. 14, 2011.
US Office action that issued with respect to related U.S. Appl. No. 12/921,815, mail date is Mar. 14, 2011.
European Search Report issued with respect to counterpart European Application No. 10815339.6.
European Office Action issued with respect to counterpart European Application No. 10815339.6.
English Translation of International Preliminary Report on Patentability for International Application No. PCT/JP2010/065408, dated Apr. 19, 2012.
Office Action issued with respect to U.S. Appl. No. 13/393,299, mail date is Jun. 16, 2014.

* cited by examiner

POLYAMIDE AND POLYAMIDE COMPOSITION

TECHNICAL FIELD

The present invention relates to a polyamide and a polyamide composition.

BACKGROUND ART

Polyamides represented by polyamide 6 and polyamide 66 (hereinafter, sometimes referred to as "PA6" and "PA66") and the like have excellent fabricability, mechanical properties, or chemical resistance. Therefore, polyamides are widely used as a material for various parts, such as for automobiles, electric and electronic parts, industrial materials, and daily and household articles.

In the automobile industry, as an environmental measure, there is a need to lighten the weight of the automobile body by using a metal substitute in order to reduce exhaust gases. To respond to this need, polyamides are being increasingly used for exterior materials, interior materials and the like. Further, the level of the properties required for polyamide materials, such as heat resistance, strength, and appearance, is dramatically increasing. Above all, the temperature in the engine room is also tending to increase, so that the need to increase the heat resistance of polyamide materials is growing stronger.

Further, in the electric and electronics industry, such as household appliances, there is a need for increased heat resistance for polyamide materials which are capable of withstanding the increased melting point of the solder required for lead-free surface-mount (SMT) solder.

PA6 and PA66 polyamides are unable to satisfy these requirements in terms of heat resistance, since their melting point is low.

To resolve the above-described problems with conventional polyamides such as PA6 and PA66, a high-melting-point polyamide has been proposed. Specifically, a polyamide formed from terephthalic acid and hexamethylenediamine (hereinafter, sometimes referred to as "PA6T") has been proposed.

However, PA6T is a high-melting-point polyamide having a melting point of about 370° C. Therefore, even if a molded product is obtained by melt kneading, pyrolysis of the polyamide is severe, which makes it difficult to obtain a molded product having sufficient properties.

To resolve the above-described problem with PA6T, a high-melting-point semi-aromatic polyamide (hereinafter, sometimes referred to as "PA6T copolymer polyamide") and the like having a melting point lowered to about 220 to 340° C. has been proposed. This high-melting-point semi-aromatic polyamide is obtained by copolymerizing an alicyclic polyamide, such as PA6 and PA66, and an amorphous aromatic polyamide (hereinafter, sometimes referred to as "PA6I") and the like with PA6T, and has terephthalic acid and hexamethylenediamine as main components.

As a PA6T copolymer polyamide, Patent Document 1 describes an aromatic polyamide which is formed from an aromatic dicarboxylic acid and an aliphatic diamine, in which the aliphatic diamine is a mixture of hexamethylenediamine and 2-methylpentamethylenediamine (hereinafter, sometimes referred to as "PA6T/2MPDT").

Further, in contrast to an aromatic polyamide formed from an aromatic dicarboxylic acid and an aliphatic diamine, a high-melting-point aliphatic polyamide (hereinafter, sometimes referred to as "PA46") formed from adipic acid and tetramethylenediamine, and an alicyclic polyamide formed from an alicyclic dicarboxylic acid and an aliphatic diamine, and the like have been proposed.

Patent Documents 2 and 3 describe a semi-alicyclic polyamide (hereinafter, sometimes referred to as "PA6C copolymer polyamide") formed from an alicyclic polyamide and another polyamide, in which the alicyclic polyamide (hereinafter, sometimes referred to as "PA6C") is formed from 1,4-cyclohexanedicarboxylic acid and hexamethylenediamine.

Patent Document 2 describes that electric and electronic parts formed from a semi-alicyclic polyamide blended with 1 to 40% of 1,4-cyclohexanedicarboxylic acid as a dicarboxylic acid unit have improved solder heat resistance. Patent Document 3 describes that automobile components formed from a semi-alicyclic polyamide have excellent fluidity, toughness and the like.

Patent Document 4 describes that a polyamide formed from a dicarboxylic acid unit containing 1,4-cyclohexanedicarboxylic acid and a diamine unit containing 2-methyl-1,8-octanediamine has excellent light fastness, toughness, moldability, low weight, heat resistance and the like. Moreover, as a production method for such a polyamide, Patent Document 4 describes that a polyamide having a melting point of 311° C. is produced by reacting 1,4-cyclohexanedicarboxylic acid and 1,9-nonanediamine at 230° C. or less to produce a prepolymer, which is then subjected to solid phase polymerization at 230° C.

Further, Patent Document 5 describes that a polyamide using 1,4-cyclohexanedicarboxylic acid having a trans/cis ratio of from 50/50 to 97/3 as a raw material has excellent heat resistance, low water absorbance, and light fastness.

Patent Document 6 discloses that, in the production of a polyamide formed from an aromatic dicarboxylic acid containing terephthalic acid and a diamine component containing 2-methylpentanediamine, cyclization of 2-methylpentamethylenediamine (which forms cyclic amino groups) can be significantly reduced by adding formic acid.

Further, Patent Documents 7 and 8 disclose that, in a polypentamethylene adipamide resin, the melt stability and heat resistance of the polyamide can be improved by reducing the bonding of cyclic amino groups derived from the pentamethylenediamine to the polymer ends by controlling the polymerization temperature and the like.

CITATION LIST

Patent Document

Patent Document 1: National Publication of International Patent Application No. 6-503590
Patent Document 2: National Publication of International Patent Application No. 11-512476
Patent Document 3: National Publication of International Patent Application No. 2001-514695
Patent Document 4: Japanese Patent Laid-Open No. 9-12868
Patent Document 5: WO 2002/048239
Patent Document 6: National Publication of International Patent Application No. 8-503018
Patent Document 7: Japanese Patent Laid-Open No. 2003-292612
Patent Document 8: Japanese Patent Laid-Open No. 2004-75932

SUMMARY OF INVENTION

Problems to be Solved by the Invention

Although PA6T copolymer polyamides certainly have properties such as low water absorbance, high heat resistance, and high chemical resistance, fluidity is low, and moldability and the surface appearance of the molded product is insufficient. In addition, their toughness and light fastness is poor. Consequently, there is a need for improvement for applications which require an excellent molded product appearance, such as an exterior component, or which are exposed to sunlight and the like. Moreover, PA6T copolymer polyamides have a large specific weight, so that there is a need for improvement in terms of reducing weight as well.

Although the PA6/2MPDT described in Patent Document 1 can partially improve on the problems of conventional PA6T copolymers, the level of improvement in terms of fluidity, moldability, toughness, molded product surface appearance, and light fastness is insufficient.

Although PA46 has good heat resistance and moldability, PA46 suffers from the problems of high water absorbance. Further, the dimensional change and deterioration in mechanical properties due to water absorbance is very large. Thus, in some cases PA46 cannot satisfy the dimensional change requirement required for automobile applications.

The PA6C described in Patent Documents 2 and 3 also suffers from problems such as having a high water absorbance and insufficient fluidity.

For the polyamides described in Patent Documents 4 and 5 too, the improvement in terms of toughness, strength, and fluidity is insufficient.

In addition, although the polyamide described in Patent Document 6 can be used to obtain a high molecular weight polymer by reducing the amount of cyclic amino groups bonded to the polymer ends, Patent Document 6 contains no description about the advantages of having at least a certain amount of cyclic amino groups bonded to the polymer ends.

Moreover, Patent Documents 7 and 8 also lack any description about the advantages of having at least a certain amount of cyclic amino groups bonded to the polymer ends of the polyamide. Further, Patent Documents 7 and 8 do not anticipate the production of a polyamide having a high melting point of 300° C. or more because the amount of cyclic amino groups bonded to the polymer ends is reduced by reducing the polycondensation temperature.

Further, these conventional polyamides cannot satisfy the need in the automotive, electrical, and electronic industries for increased heat resistance, especially in terms of stability under heating and durability under heating.

It is an object of the present invention to provide a polyamide having a high melting point, which has excellent strength, toughness, and stability under heating. Further, it is also an object of the present invention to provide a polyamide composition that has excellent strength, durability under heating, resistance to hydrolysis, and fabricability.

Means for Solving the Problems

As a result of diligent research to resolve the above-described problems, the present inventors discovered that these problems could be resolved by a polyamide obtained by polymerizing an alicyclic dicarboxylic acid and a diamine having a pentamethylenediamine skeleton as the main constituent components, and a polyamide composition containing such a polyamide and an organic filler, thereby completing the present invention.

Specifically, the present invention is as follows.

(1)
A polyamide obtained by polymerizing
an (a) dicarboxylic acid comprising at least 50 mol % of an alicyclic dicarboxylic acid and
a (b) diamine comprising at least 50 mol % of a diamine having a pentamethylenediamine skeleton, wherein the polyamide has a cyclic amino end amount of 30 to 60μ equivalents/g.

(2)
The polyamide according to (1), wherein the polyamide has a sulfuric acid relative viscosity $\eta r$ at 25° C. of 2.3 or more.

(3)
The polyamide according to (1) or (2), wherein the polyamide has an amino end amount of 20μ equivalents/g or more.

(4)
The polyamide according to any of (1) to (3), wherein the polyamide is obtained by polymerizing at a reaction temperature exceeding 300° C.

(5)
The polyamide according to any of (1) to (4), wherein the cyclic amino end is produced by a cyclization reaction of a diamine having a pentamethylenediamine skeleton.

(6)
The polyamide according to any of (1) to (5), wherein the polyamide is obtained by carrying out a solid phase polymerization step in at least a part of the polymerization process.

(7)
A polyamide composition comprising the polyamide according to any of (1) to (6) and an inorganic filler.

Advantages of the Invention

According to the present invention, a polyamide can be provided having a high melting point, which has excellent strength, toughness, and stability under heating. Further, according to the present invention, a polyamide composition can be provided that has excellent strength, durability under heating, resistance to hydrolysis, and fabricability.

MODE FOR CARRYING OUT THE INVENTION

Hereinafter, a mode for carrying out the present invention (hereinafter, referred to as "present embodiment") will be described in detail. However, the present invention is not limited to the following embodiment, and can be variously modified within the scope of the intent of the invention.
Polyamide
The polyamide according to the present embodiment is a polyamide obtained by polymerizing the following (a) and (b):
an (a) dicarboxylic acid comprising at least 50 mol % of an alicyclic dicarboxylic acid, and
a (b) diamine comprising at least 50 mol % of a diamine having a pentamethylenediamine skeleton.

In the present embodiment, "polyamide" means a polymer which has an amide bond (—NHCO—) in a main chain.
(a) Dicarboxylic Acid
The (a) dicarboxylic acid used in the present embodiment comprises at least 50 mol % of an alicyclic dicarboxylic acid.

By comprising at least 50 mol % of an alicyclic dicarboxylic acid as the (a) dicarboxylic acid, a polyamide can be obtained which has a high melting point and which simultaneously satisfies strength, toughness, stability under heating, and the like. Further, the polyamide according to the present embodiment can be obtained as a polyamide having excellent heat resistance, fluidity, and low water absorbance.

Examples of the (a-1) alicyclic dicarboxylic acid (also referred to as cycloaliphatic dicarboxylic acid) include alicyclic dicarboxylic acids having an alicyclic structure with 3 to 10 carbon atoms, and preferably 5 to 10 carbon atoms, such as 1,4-cyclohexanedicarboxylic acid, 1,3-cyclohexanedicarboxylic acid, and 1,3-cyclopentanedicarboxylic acid.

The alicyclic dicarboxylic acid may optionally have a substituent.

In the alicyclic dicarboxylic acid, examples of substituents include an alkyl group having 1 to 4 carbon atoms, such as a methyl group, an ethyl group, a n-propyl group, an isopropyl group, a n-butyl group, an isobutyl group, and a tert-butyl group.

From perspectives such as heat resistance, low water absorbance, and strength, 1,4-cyclohexanedicarboxylic acid is preferred as the alicyclic dicarboxylic acid.

As the alicyclic dicarboxylic acid, one kind may be used, or two or more kinds may be used in combination.

Alicyclic dicarboxylic acids have trans and cis geometric isomers.

The alicyclic dicarboxylic acid used as a raw material monomer of the polyamide may be either a trans or a cis isomer. The alicyclic dicarboxylic acid may also be used as a mixture of trans and cis isomers in various ratios.

Since alicyclic dicarboxylic acids isomerize in a fixed ratio at high temperatures, and the cis isomer has a higher water solubility than the trans isomer in an equivalent amount of salt with a diamine, a trans isomer/cis isomer ratio is, based on molar ratio, preferably 50/50 to 0/100, more preferably 40/60 to 10/90, and still more preferably 35/65 to 15/85.

The alicyclic dicarboxylic acid trans isomer/cis isomer ratio (molar ratio) can be determined by liquid chromatography (HPLC) or nuclear magnetic resonance spectroscopy (NMR).

Examples of an (a-2) dicarboxylic acid other than the alicyclic dicarboxylic acid of the (a) dicarboxylic acid used in the present embodiment include aliphatic dicarboxylic acids and aromatic dicarboxylic acids.

Examples of the aliphatic dicarboxylic acids include straight-chain or branched saturated aliphatic dicarboxylic acids having 3 to 20 carbon atoms, such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyl adipic acid, pimelic acid, suberic acid, azelaic acid, sebacic acid, dodecanedioic acid, tetradecanedioic acid, hexadecanedioic acid, octadecanedioic acid, eicosane diacid, and diglycolic acid.

Examples of the aromatic dicarboxylic acids include aromatic dicarboxylic acids, which are unsubstituted or substituted with various substituents, having 8 to 20 carbon atoms, such as terephthalic acid, isophthalic acid, naphthalene dicarboxylic acid, 2-chloroterephthalic acid, 2-methylterephthalic acid, 5-methylisophthalic acid, and 5-sodium sulfoisophthalic acid.

In the aromatic dicarboxylic acids, examples of the various substituents include an alkyl group having 1 to 4 carbon atoms, an aryl group having 6 to 10 carbon atoms, an arylalkyl group having 7 to 10 carbon atoms, a halogen group such as a chloro group or a bromo group, a silyl group having 1 to 6 carbon atoms, and a sulfonic acid group or salt thereof, such as a sodium salt.

When the dicarboxylic acid other than the alicyclic dicarboxylic acid is copolymerized, from perspectives such as heat resistance, fluidity, toughness, low water absorbance, and strength, an aliphatic dicarboxylic acid is preferred as the dicarboxylic acid, and more preferred is an aliphatic dicarboxylic acid having 6 or more carbon atoms.

Of these, from perspectives such as heat resistance and low water absorbance, an aliphatic dicarboxylic acid having 10 or more carbon atoms is preferred.

Examples of the aliphatic dicarboxylic acids having 10 or more carbon atoms include sebacic acid, dodecanedioic acid, tetradecanedioic acid, hexadecanedioic acid, octadecanedioic acid, and eicosanedioic acid. Of these, from perspectives such as heat resistance, sebacic acid and dodecanedioic acid are preferred.

As the dicarboxylic acid other than an alicyclic dicarboxylic acid, one kind may be used, or two or more kinds may be used in combination.

To the extent that the object of the present embodiment is not harmed, the (a) dicarboxylic acid may further include a trivalent or higher polyvalent carboxylic acid, such as trimellitic acid, trimesic acid, and pyromellitic acid.

As the polyvalent carboxylic acid, one kind may be used, or two or more kinds may be used in combination.

A ratio (mol %) of the (a-1) alicyclic dicarboxylic acid in the (a) dicarboxylic acid is at least 50 mol %. The ratio of the alicyclic dicarboxylic acid is 50 to 100 mol %, preferably 60 to 100 mol %, more preferably 70 to 100 mol %, and still more preferably 100 mol %.

By setting the ratio of the alicyclic dicarboxylic acid to be at least 50 mol %, that is, 50 mol % or more, a polyamide can be obtained which has excellent strength and toughness, and high melting point.

A ratio of the (a-2) dicarboxylic acid other than the alicyclic dicarboxylic acid in the (a) dicarboxylic acid is 0 to 50 mol %, preferably 0 to 40%, and more preferably 0 to 30 mol %.

When the aliphatic dicarboxylic acids having 10 or more carbon atoms as the dicarboxylic acid are included, it is preferred that the (a-1) alicyclic dicarboxylic acid is 50 to 99.9 mol % and the (a-2) aliphatic dicarboxylic acid having 10 or more carbon atoms is 0.1 to 50 mol %. It is more preferred that the (a-1) alicyclic dicarboxylic acid is 60 to 99 mol % and the (a-2) aliphatic dicarboxylic acid having 10 or more carbon atoms is 1 to 40 mol %. It is still more preferred that the (a-1) alicyclic dicarboxylic acid is 70 to 99 mol % and the (a-2) aliphatic dicarboxylic acid having 10 or more carbon atoms is 1 to 30 mol %.

In the present embodiment, the (a) dicarboxylic acid is not limited to the compounds described above as dicarboxylic acids. The dicarboxylic acid may be a compound equivalent to those described above.

Examples of compounds equivalent to those described above are not especially limited, as long as such compound can have the same dicarboxylic acid structure as a dicarboxylic acid structure derived from the above-described dicarboxylic acids. Examples thereof include anhydrides and halides of the dicarboxylic acid.

(b) Diamine

The (b) diamine used in the present embodiment comprises at least 50 mol % of a diamine having a pentamethylenediamine skeleton.

By comprising at least 50 mol % of a diamine having a pentamethylenediamine skeleton in the (b) diamine, a polyamide can be obtained which simultaneously satisfies strength, toughness, and the like. Further, a polyamide according to the present embodiment can be obtained which has excellent moldability.

The (b-1) diamines having the pentamethylenediamine skeleton can also be represented as a diamine having 1,5-diaminopentane skeleton.

Examples of the diamines having the pentamethylenediamine skeleton include saturated aliphatic diamines having 5 to 20 carbon atoms, such as pentamethylenediamine, 2-methylpentamethylenediamine, 2-ethylpentamethylenediamine, 3-n-butylpentamethylenediamine, 2,4-dimethylpentamethylenediamine, 2-methyl-3-ethylpentamethylenediamine, and 2,2,4-trimethylpentamethylenediamine.

The above diamines having the pentamethylenediamine skeleton can also be written as, respectively, 1,5-diaminopentane, 2-methyl-1,5-diaminopentane, 2-ethyl-1,5-diaminopentane, 3-n-butyl-1,5-diaminopentane, 2,4-dimethyl-1,5-diaminopentane, 2-methyl-3-ethyl-1,5-diaminopentane, and 2,2,4-trimethyl-1,5-diaminopentane.

From the perspective of heat resistance and strength, it is preferred that the diamine having the pentamethylenediamine skeleton is pentamethylenediamine and 2-methylpentamethylenediamine, and more preferable is 2-methylpentamethylenediamine.

As the diamine having the pentamethylenediamine skeleton, one kind may be used, or two or more kinds may be used in combination.

Examples of a (b-2) diamine other than the diamine having the pentamethylenediamine skeleton of the (b) diamine used in the present embodiment include aliphatic diamines, alicyclic diamines, and aromatic diamines.

Examples of the aliphatic diamines include saturated aliphatic diamines having 2 to 20 carbon atoms, such as ethylenediamine, propylenediamine, tetramethylenediamine, hexamethylenediamine, 2-methylhexamethylenediamine, 2,4-dimethylhexamethylenediamine, heptamethylenediamine, octamethylenediamine, nonamethylenediamine, 2-methyloctamethylenediamine, decamethylenediamine, undecamethylenediamine, dodecamethylenediamine, and tridecamethylenediamine.

In the present embodiment, the diamines having the pentamethylenediamine skeleton are not included in the aliphatic diamine.

Examples of the alicyclic diamines (also referred to as cycloaliphatic diamines) include 1,4-cyclohexanediamine, 1,3-cyclohexanediamine, and 1,3-cyclopentanediamine.

Examples of the aromatic diamines include diamines having a aromatic structure, such as meta-xylylenediamine.

From perspectives such as heat resistance, fluidity, toughness, low water absorbance, and strength, the aliphatic diamine and the alicyclic diamine are preferred as the diamine other than the diamine having the pentamethylenediamine skeleton. More preferred is a straight-chain saturated aliphatic diamine having 4 to 13 carbon atoms, still more preferred is a straight-chain saturated aliphatic diamine having 6 to 10 carbon atoms, and even still more preferred is hexamethylenediamine.

As the (b-2) diamine other than the diamine having the pentamethylenediamine skeleton, one kind may be used, or two or more kinds may be used in combination.

To the extent that the object of the present embodiment is not harmed, the (b) diamine may further include a trivalent or higher polyvalent aliphatic amine, such as bishexamethylenetriamine.

As the polyvalent aliphatic amine, one kind may be used, or two or more kinds may be used in combination.

A ratio (mol %) of the (b-1) diamine having the pentamethylenediamine skeleton in the (b) diamine is at least 50 mol %. The ratio of the diamine having the pentamethylenediamine skeleton is 50 to 100 mol %, preferably 60 to 100%, more preferably 80 to 100 mol %, even more preferably 85 to 100 mol %, still more preferably 90 to 100 mol %, and most preferably 100 mol %.

By setting the ratio of the diamine having the pentamethylenediamine skeleton to be at least 50 mol %, that is, 50 mol % or more, a polyamide can be obtained which has excellent toughness, strength and the like.

A ratio (mol %) of the (b-2) diamine other than the diamine having the pentamethylenediamine skeleton in the (b) diamine is 0 to 50 mol %, preferably 0 to 40 mol %, more preferably 0 to 20 mol %, still more preferably 0 to 15 mol %, still much more preferably 0 to 10 mol %, and most preferably 0 mol %.

An added amount of the (a) dicarboxylic acid is preferably about the same molar amount as an added amount of the (b) diamine. Considering escape out of the (b) diamine reaction system during the polymerization reaction in the molar ratio, based on the (a) dicarboxylic acid molar amount of 1, the total (b) diamine molar amount is preferably 0.9 to 1.2, more preferably 0.95 to 1.1, and still more preferably 0.98 to 1.05.

(c) Lactam and/or Aminocarboxylic Acid

From the perspective of toughness, the polyamide according to the present embodiment may be obtained by further copolymerizing with a (c) lactam and/or aminocarboxylic acid.

The term "(c) lactam and/or aminocarboxylic acid" used in the present embodiment means a lactam and/or aminocarboxylic acid capable of polymerizing with the polyamide.

If the polyamide is produced by copolymerizing the (a) dicarboxylic acid, the (b) diamine, and the (c) lactam and/or aminocarboxylic acid, then the (c) lactam and/or aminocarboxylic acid is preferably a lactam and/or aminocarboxylic acid having 4 to 14 carbon atoms, and more preferably a lactam and/or aminocarboxylic acid having 6 to 12 carbon atoms.

Examples of the lactams include butyrolactam, pivalolactam, $\epsilon$-caprolactam, caprylolactam, enantholactam, undecanonelactam, and laurolactam (dodecanolactam). Of these, from the perspective of toughness, $\epsilon$-caprolactam, laurolactam and the like are preferred, and $\epsilon$-caprolactam is more preferred.

Examples of the aminocarboxylic acid include $\omega$-aminocarboxylic acid and $\alpha,\omega$-aminocarboxylic acid, which are compounds obtained by opening the ring of the above-described lactams.

As the aminocarboxylic acid, a straight-chain or branched saturated aliphatic carboxylic acid having 4 to 14 carbon atoms substituted at the $\omega$ position with an amino group is preferred. Examples thereof include 6-aminocaproic acid, 11-aminoundecanoic acid, and 12-aminododecanoic acid. Further examples of the aminocarboxylic acid include para-aminomethylbenzoic acid.

As the lactam and/or aminocarboxylic acid, one kind may be used, or two or more kinds may be used in combination.

An added amount (mol %) of the (c) lactam and/or aminocarboxylic acid is preferably 0 to 20 mol % based on the total molar amount of the respective monomers of (a), (b), and (c).

When the polyamide is obtained by polymerizing the (a) dicarboxylic acid and the (b) diamine, a known end-capping agent can be added to polymerize for molecular weight regulation.

Examples of the end-capping agent include monocarboxylic acids, monoamines, acid anhydrides such as phthalic anhydride, monoisocyanates, monoacid halides, monoesters, and monoalcohols. From the perspective of thermal stability, monocarboxylic acids and monoamines are preferred.

As the end-capping agent, one kind may be used, or two or more kinds may be used in combination.

Examples of the monocarboxylic acids which can be used as the end-capping agent are not especially limited, as long as the monocarboxylic acid is reactive with an amino group. Examples thereof include: aliphatic monocarboxylic acids such as formic acid, acetic acid, propionic acid, butyric acid, valeric acid, caproic acid, caprylic acid, lauric acid, tridecyl acid, myristyl acid, pulmitic acid, stearic acid, pivalic acid, and isobutyric acid; alicyclic monocarboxylic acids such as cyclohexane carboxylic acid; and aromatic monocarboxylic acids such as benzoic acid, toluic acid, α-naphthalene carboxylic acid, β-naphthalene carboxylic acid, methylnaphthalene carboxylic acid, and phenylacetic acid.

As the monocarboxylic acid, one kind may be used, or two or more kinds may be used in combination.

Examples of the monoamines which can be used as the end-capping agent are not especially limited, as long as the monoamine is reactive with a carboxyl group. Examples thereof include: aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; and cyclic amines such as pyrrolidine, piperizine, and 3-methylpiperizine.

As the monoamine, one kind may be used, or two or more kinds may be used in combination.

A combination of the (a) dicarboxylic acid and the (b) diamine is not especially limited. A preferred example is a combination of (a-1) at least 50 mol % of an alicyclic dicarboxylic acid and (b-1) at least 50 mol % of 2-methylpentamethylenediamine or pentamethylenediamine, and a more preferred example is a combination of (a-1) at least 50 mol % of 1,4-cyclohexanedicarboxylic acid and (b-1) at least 50 mol % of 2-methylpentamethylenediamine.

By polymerizing the (a) dicarboxylic acid and the (b) diamine in the combination as polyamide components, a polyamide can be produced that has a high melting point, and which has excellent strength, toughness, and stability under heating.

The polyamide according to the present embodiment can be produced, but not especially limited, based on a polyamide production method that comprises a step of polymerizing the (a) dicarboxylic acid comprising at least 50 mol % of the alicyclic dicarboxylic acid and the (b) diamine comprising at least 50 mol % of the diamine having the pentamethylenediamine skeleton. It is preferred that the polyamide according to the present embodiment is a polyamide obtained by carrying out a solid phase polymerization step in at least a part of the polymerization process.

It is preferred that the method for producing the polyamide further comprises a step of increasing the degree of polymerization of the polyamide.

The methods for producing the polyamide may be illustrated, but not particularly limited, by the following production method examples.

1) Heating an aqueous solution or an aqueous suspension of a dicarboxylic acid and a diamine salt, or a mixture thereof, and polymerizing while maintaining the melt state (hereinafter, sometimes abbreviated as "hot melt polymerization").

2) Increasing the degree of polymerization while maintaining a solid state at a temperature at or below the melting point of the polyamide obtained by hot melt polymerization (hereinafter, sometimes abbreviated as "hot melt polymerization/solid phase polymerization")

3) Heating an aqueous solution or an aqueous suspension of a dicarboxylic acid and a diamine salt or mixture thereof, and increasing the degree of polymerization by further re-melting the precipitated prepolymer with an extruder such as a kneader (hereinafter, sometimes abbreviated as "prepolymer/extrusion polymerization").

4) Heating an aqueous solution or an aqueous suspension of a dicarboxylic acid and a diamine salt or mixture thereof, and increasing the degree of polymerization while maintaining the precipitated prepolymer in a solid state at a temperature at or below the melting point of the polyamide (hereinafter, sometimes abbreviated as "prepolymer/solid phase polymerization").

5) Polymerizing a dicarboxylic acid and a diamine salt, or mixture thereof by a single stage, while maintaining a solid state (hereinafter, sometimes abbreviated as "single-stage solid phase polymerization").

6) A "melt method" in which polymerization is carried out using a dicarboxylic acid halide equivalent to a dicarboxylic acid and a diamine.

Preferred examples of the polyamide production method include (1) hot melt polymerization, (2) hot melt polymerization/solid phase polymerization, (4) prepolymer/solid phase polymerization, and (5) single-stage solid phase polymerization. More preferred are (2) hot melt polymerization/solid phase polymerization and (4) prepolymer/solid phase polymerization.

To improve the molecular weight of the polyamide, it is preferred to carry out solid phase polymerization in the polyamide production method. Further, it is more preferred to improve the molecular weight of the polyamide by performing solid phase polymerization than by performing hot melt polymerization, because the cyclic amino end amount in the polyamide can be controlled to a predetermined level.

In the polyamide production method, when performing hot melt polymerization, it is preferred to add an additive during polymerization.

Examples of an additive added during polymerization include the (b) diamine, which is a raw material of the polyamide.

The term "added amount" of the (b) diamine as an additive added during polymerization means the additional amount of diamine that is added. It is preferred that this added amount is, based on the (b) diamine used to produce an equimolar amount of dicarboxylic acid/diamine salt, preferably 0.1 to 10 mol %, more preferably 0.5 to 5 mol %, even more preferably 1.5 to 4.5 mol %, and still more preferably 2.6 to 4 mol %.

By setting the added amount of the (b) diamine within the above range, the cyclic amino end amount as well as the amino end amount may be controlled to a target value.

As the additive added during polymerization, an organic acid such as formic acid and acetic acid may be added. Adding formic acid and the like can facilitate control of the cyclic amino end amount of the polymer ends.

In the polyamide production method, the polymerization mode may be either a batch method or a continuous method.

In the hot melt polymerization method, polymerization reaction may be performed by using an autoclave type reactor, a tumbler type reactor, and an extruder type reactor such as a kneader.

The polyamide production method is not especially limited. For example, the polyamide can be produced by the batch hot melt polymerization method.

Batch hot melt polymerization may be carried out by, for example, with water as a solvent, concentrating an approximately 40 to 60 mass % solution containing the polyamide components ((a) dicarboxylic acid, (b) diamine, and optionally (c) lactam and/or aminocarboxylic acid) in a concentration tank operated at a temperature of 110 to 180° C. and a pressure of about 0.035 to 0.6 MPa (gauge pressure) to about 65 to 90 mass % to obtain a concentrated solution. Then, this concentrated solution is transferred to an autoclave, and heating is continued until the pressure in the vessel reaches about 1.5 to 5.0 MPa (gauge pressure). Subsequently, the pressure is kept at about 1.5 to 5.0 MPa (gauge pressure) while extracting water and/or the gas component. When the temperature reaches about 250 to 350° C., the pressure is started to be reduced to atmospheric pressure (gauge pressure of 0 MPa). After reducing the pressure to atmospheric pressure, the water produced as a byproduct can be effectively removed by reducing the pressure as necessary. It is preferred to control so that the reaction temperature when the reaction finishes is at a maximum. It is preferred that the maximum temperature is 280 to 400° C. The pressure is increased with an inert gas such as nitrogen, and a polyamide melt product is extruded as a strand. This strand is cooled and cut to obtain a pellet.

The polyamide production method is not especially limited. For example, the polyamide can be produced by the continuous hot melt polymerization method.

Continuous hot melt polymerization can be carried out by, for example, with water as a solvent, pre-heating an approximately 40 to 60 mass % solution containing the polyamide components ((a) dicarboxylic acid, (b) diamine, and optionally (c) lactam and/or aminocarboxylic acid) in the vessel of a preliminary apparatus to a temperature of about 40 to 100° C. Then, the pre-heated solution is transferred to a concentration tank/reactor, and concentrated to about 70 to 90% at a pressure of about 0.1 to 0.5 MPa (gauge pressure) and a temperature of about 200 to 270° C. to obtain a concentrated solution. This concentrated solution is then discharged into a flusher having a temperature maintained at about 200 to 400° C. Subsequently, the pressure is reduced to atmospheric pressure (gauge pressure of 0 MPa). After reducing the pressure to atmospheric pressure, the pressure is reduced as necessary. It is preferred to control so that the reaction temperature when the reaction finishes is at a maximum. It is preferred that the maximum temperature is 280 to 400° C. A polyamide melt product is extruded as a strand. This strand is cooled and cut to obtain a pellet.

The maximum reaction temperature during hot melt polymerization is preferably 280 to 400° C., and more preferably is a temperature exceeding 300° C. Further, it is preferred that this maximum temperature is 360° C. or less. Setting the maximum reaction temperature during hot melt polymerization in the above range facilitates control of the cyclic amino end amount, while suppressing pyrolysis of the polyamide.

The method for producing the polyamide is not especially limited. For example, the polyamide can be produced by the below-described solid phase polymerization method.

Examples of reactors that can be used in the solid phase polymerization method include a tumbler type reactor, a vibration dryer type reactor, a Nauta mixer type reactor, a stirring type reactor and the like.

The above-described reactor is charged with pellets, flakes, or a powder of the polyamide. Then, the molecular weight of the polyamide is improved by heating at a temperature equal to or less than the melting point of the polyamide under a flow of an inert gas, such as nitrogen, argon and helium, or under a reduced pressure, or alternatively while feeding an inert gas from a lower portion of the reactor while extracting the internal gases under reduced pressure from an upper portion of the reactor. The solid phase polymerization reaction temperature is preferably 100 to 350° C., more preferably 120 to 300° C., and even more preferably 150 to 270° C.

The polyamide can be obtained by removing from the reactor after stopping the heating under a flow of an inert gas, or a reduced pressure, or alternatively while feeding an inert gas from a lower portion of the reactor while extracting the internal gases under reduced pressure from an upper portion of the reactor, and then reducing the reaction temperature to preferably 0 to 100° C., and more preferably room temperature to 60° C.

It is preferred that the method for producing the polyamide is a method in which the dicarboxylic acid and the diamine (and optionally lactam and/or aminocarboxylic acid) are polymerized by performing the hot melt polymerization at a temperature in which the maximum reaction temperature preferably exceeds 300° C., and in which the polyamide obtained by the hot melt polymerization method or the prepolymer method is obtained by the solid phase polymerization at a reaction temperature that is equal to or less than the melting point of the polyamide. Based on these production methods, a polyamide can be produced that has an increased molecular weight, excellent strength, durability under heating, resistance to hydrolysis and the like, while making facilitating control of the amount of cyclic amino ends.

The polymer ends of the polyamide according to the present embodiment may be any of: 1) amino ends, 2) carboxyl ends, 3) cyclic amino ends, 4) ends produced by an end-capping agent, and 5) other ends.

The term "polymer ends of the polyamide" refers to an end group of the polymer chain of a polymer formed by polymerizing dicarboxylic acid and diamine (and optionally lactam and/or aminocarboxylic acid) by an amide bond.

1) The term "amino end" means that the polymer end is an amino group (—$NH_2$ group), which is formed when the polymer chain end is the raw material diamine.

2) The term "carboxyl end" means that the polymer end is a carboxyl group (—COOH group), which is formed when the polymer chain end is the raw material dicarboxylic acid.

3) The term "cyclic amino end" means that the polymer end is a cyclic amino group.

The cyclic amino group is a group represented by the following formula.

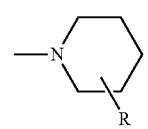

Formula

In the above formula, R represents a hydrogen atom or an alkyl group having 1 to 4 carbon atoms, such as a methyl group, an ethyl group, a t-butyl group and the like.

The cyclic amino end may be a piperidine structure formed by cyclization of the raw material diamine having a pentamethylenediamine skeleton by a deammoniation reaction. In this case, R represents an alkyl group on a side chain moiety other than the pentamethylenediamine skeleton of the diamine having a pentamethylenediamine skeleton. In the above formula, although R is indicated as monosubstituted, R may be disubstituted or tri- or greater polysubstituted so as to match the side chain moiety of the diamine having a pentamethylenediamine skeleton.

4) The term "end produced by an end-capping agent" means that the polymer end is capped with an end-capping agent added during polymerization. Such an end has a structure derived from the end-capping agent, such as a monocarboxylic acid or a monoamine.

5) The term "other end" refers to a polymer end that is not classified as any of 1) to 4). For example, such an end may be produced by performing a deammoniation reaction on an amino end or performing a decarboxylation reaction on a carboxyl end.

The cyclic amino end amount in the polyamide is 30 to 60μ equivalents/g, and preferably 35 to 55μ equivalents/g.

Setting the cyclic amino end amount in the above range enables the strength, toughness, and stability under heating of the polyamide to be improved.

The cyclic amino end amount is represented based on the number of moles of cyclic amino ends present in 1 g of the polyamide.

The cyclic amino end amount can be measured using $^1$H-NMR, as described in the below examples.

For example, the cyclic amino end amount can be calculated based on the integral ratio between the hydrogen bonded to the carbon adjacent to the nitrogen atom on a piperidine ring and the hydrogen bonded to the carbon adjacent to the nitrogen atom of the amide bond in the polyamide main chain.

The cyclic amino ends can be produced by a dehydration reaction between a cyclic amine having a piperidine ring and a carboxyl end, or by a deammoniation reaction of an amino end on a polymer end in the polymer molecule.

Cyclic amino ends that are produced by a dehydration reaction between a cyclic amine and a carboxyl end can also be produced by adding to the polymerization reaction system using a cyclic amine having a piperidine ring as an end-capping agent, or from a cyclic amine produced in a polymerization reaction system by performing a deammoniation reaction on a diamine having a pentamethylenediamine skeleton in a monomer molecule.

It is preferred that the cyclic amino ends are derived from a cyclization reaction of the raw material diamine having the pentamethylenediamine skeleton. Since adding a cyclic amine having a piperidine ring as an end-capping agent during the initial stages of polymerization means that during the initial stages of polymerization the capping is carried out with a low molecular weight carboxyl end, the polymerization reaction rate of the polyamide decreases. Consequently, this is a factor in making it more difficult to obtain a high molecular weight polymer. In contrast, when a cyclic amine having a piperidine ring is produced in the middle of the reaction, it is easier to obtain a high molecular weight polymer of the polyamide since the cyclic amino ends are produced during the late stage of polymerization.

Adjustment of the cyclic amino end amount to a predetermined level can be controlled by appropriately adjusting the polymerization temperature, the reaction time at the above-described reaction temperature that exceeds 300° C. during the polymerization process, the added amount of the diamine for producing the cyclic amine and the like.

The cyclic amine having the piperidine ring that produces the cyclic amino ends can also be produced as a byproduct during the polyamide polymerization reaction. Concerning production of this cyclic amine having the piperidine ring, the higher the reaction temperature is, the faster the reaction speed is.

To keep the cyclic amino end amount in the polyamide at a certain level, production of the cyclic amine having the piperidine ring needs to be promoted. Therefore, it is preferred that the polyamide polymerization reaction temperature is 280 to 400° C., more preferably is more than 300° C., and even more preferably is 320° C. or more. Further, it is also preferred that the polyamide polymerization reaction temperature is not greater than 360° C.

The amino end amount is preferably 20μ equivalents/g or more, more preferably 20 to 100μ equivalents/g, and even more preferably 25 to 70μ equivalents/g.

Setting the amino end amount in the above range enables the hydrolysis resistance and the melt stability of the polyamide to be improved.

The amino end amount is represented based on the number of moles of amino ends present in 1 g of the polyamide.

The amino end amount can be measured using the method described in the below examples.

The molecular weight of the polyamide may be based on an index of the sulfuric acid relative viscosity ηr at 25° C. The sulfuric acid relative viscosity ηr at 25° C. is preferably 2.3 or more, more preferably 2.3 to 7.0, even more preferably 2.5 to 5.5, and especially preferably 2.8 to 4.0.

By setting the sulfuric acid relative viscosity ηr at 25° C. to be 2.3 or more, the polyamide has excellent mechanical properties, such as strength and toughness. From the perspective of melt fluidity, if the polyamide has a sulfuric acid relative viscosity ηr at 25° C. of 7.0 or less, the polyamide has excellent fluidity.

As described in the below examples, the sulfuric acid relative viscosity ηr at 25° C. can be measured at 25° C. in 98% sulfuric acid based on JIS-K6920.

Further, as a polyamide molecular weight index, the formic acid relative viscosity VR at 25° C. can also be used. The formic acid relative viscosity VR at 25° C. can be measured at 25° C. in 90% formic acid based on JIS-K6920.

From the perspective of heat resistance, the polyamide preferably has a melting point, referred to as Tm2, of 270 to 350° C. The melting point Tm2 is preferably 270° C. or more, more preferably 275° C. or more, and still more preferably 280° C. or more. Further, the melting point Tm2 is preferably 350° C. or less, more preferably 340° C. or less, even more preferably 335° C. or less, and still more preferably 330° C. or less.

By setting the polyamide melting point Tm2 to be 270° C. or more, a polyamide having excellent heat resistance can be obtained. By setting the polyamide melting point Tm2 to be 350° C. or less, pyrolysis of the polyamide during melt processing such as extrusion and molding can be suppressed.

Measurement of the melting point (Tm1 or Tm2) and the heat of fusion ΔH of the polyamide can be carried out based on JIS-K7121 as described in the below examples.

Examples of the melting point and heat of fusion measurement apparatus include the Diamond-DSC, manufactured by PerkinElmer Inc.

The polyamide preferably has a color tone as b value of 10 or less, more preferably 8 or less, and still more preferably 6 or less.

The b value can be measured by the method described in the below examples. By setting the b value to be 10 or less, a polyamide composition having excellent resistance to heat discoloration can be obtained.

Polyamide Composition

The polyamide composition according to the present embodiment is a polyamide composition comprising the above-described polyamide and an inorganic filler.

As a polyamide composition, by comprising the inorganic filler, a polyamide composition can be obtained having especially excellent strength, durability under heating, resistance to hydrolysis, and fabricability while satisfying toughness, strength, thermal stability and high melting point, without harming the polyamide qualities of having excellent toughness, strength, stability under heating and the like and having high melting point.

The polyamide composition also has excellent light fastness and color tone as a polyamide composition, despite comprising an inorganic filler. Further, since the above-described polyamide has excellent heat resistance, fluidity, low water absorbance and the like, the polyamide composition can also be obtained that has excellent heat resistance, fluidity, low water absorbance, rigidity and the like.

The inorganic filler is not especially limited. Examples thereof include a glass fiber, a carbon fiber, a calcium silicate fiber, a potassium titanate fiber, an aluminum borate fiber, glass flakes, talc, kaolin, mica, hydrotalcite, calcium carbonate, magnesium carbonate, zinc carbonate, zinc oxide, calcium phosphate monobasic, wollastonite, silica, zeolite, alumina, boehmite, aluminum hydroxide, titanium oxide, silicon oxide, magnesium oxide, calcium silicate, sodium aluminosilicate, magnesium silicate, Ketchen black, acetylene black, furnace black, carbon nanotubes, graphite, brass, copper, silver, aluminum, nickel, iron, calcium fluoride, clay, montmorillonite, expandable fluorine mica, silicon nitride and an apatite.

As the inorganic filler, one kind may be used, or two or more kinds may be used in combination.

From the perspective of strength and rigidity, it is preferred that the inorganic filler is a glass fiber, a carbon fiber, a potassium titanate fiber, an aluminum borate fiber, glass flakes, talc, kaolin, mica, silicon nitride, calcium carbonate, magnesium carbonate, calcium phosphate monobasic, wollastonite, silica, carbon nanotubes, graphite, calcium fluoride, clay, montmorillonite, expandable fluorine mica, an apatite and the like. It is more preferred that the inorganic filler is at least one kind selected from the group consisting of a glass fiber, a potassium titanate fiber, an aluminum borate fiber, talc, kaolin, mica, silicon nitride, calcium carbonate, magnesium carbonate, wollastonite, and clay.

The glass fibers and carbon fibers may have a cross-section that is a true circle or that is flattened. Examples of the flattened cross-section include rectangular, an oval shape close to rectangular, an elliptical shape, a pod shape having a constricted middle section in the longitudinal direction and the like.

Among glass fibers and carbon fibers, it is more preferred to use those having a number average fiber diameter of 3 to 30 µm, a weight average fiber length of 100 to 750 µm, and an aspect ratio (L/D) of number average fiber length (D) to number average fiber diameter (L) of 10 to 100 from the perspective of enabling the polyamide composition to have excellent mechanical properties.

In the present embodiment, the number average fiber diameter of the inorganic filler in the polyamide composition may be determined by, for example, placing the polyamide composition in an electric furnace, combusting the organic matter comprised in the polyamide composition, and from the resultant residue, for example, arbitrarily selecting 100 or more glass fibers, observing those selected fibers under SEM, and measuring the fiber diameters.

The weight average fiber length of the inorganic filler in the polyamide composition may be determined by arbitrarily selecting glass fibers in a similar manner, and measuring the fiber lengths using a SEM at 1,000 times magnification.

The inorganic filler such as a glass fiber or carbon fiber may be surface treated with a silane coupling agent and the like.

The silane coupling agent is not particularly limited, and may be, for example, an aminosilane such as γ-aminopropyltriethoxysilane, γ-aminopropyltrimethoxysilane and N,-β-(aminoethyl)-γ-aminopropylmethyldimethoxysilane; a mercaptosilane such as γ-mercaptopropyltrimethoxysilane and γ-mercaptopropyltriethoxysilane; an epoxy silane; a vinyl silane and the like. Among these, an amino silane is preferred.

As the silane coupling agent, one kind may be used, or two or more kinds may be used in combination.

The fibrous inorganic filler such as a glass fiber or carbon fiber may further comprise, as a sizing agent, a copolymer that comprises as constituent units an unsaturated vinyl monomer containing carboxylic acid anhydride and an unsaturated vinyl monomer, an epoxy compound, a polyurethane resin, an acrylic acid homopolymer, a copolymer of acrylic acid and another copolymerizable monomer, and a salt with a primary, secondary, or tertiary amine thereof. Among these, from the perspective of the mechanical properties (among those, strength) of the polyimide composition, preferred are a copolymer that comprises as constituent units an unsaturated vinyl monomer containing carboxylic acid anhydride and an unsaturated vinyl monomer (also written as a copolymer that comprises as constituent units an unsaturated vinyl monomer containing carboxylic acid anhydride and an unsaturated vinyl monomer that is different from the unsaturated vinyl monomer containing carboxylic acid anhydride), an epoxy compound, and a polyurethane resin. More preferred are a copolymer that comprises as constituent units an unsaturated vinyl monomer containing carboxylic acid anhydride and an unsaturated vinyl monomer, and a polyurethane resin.

The unsaturated vinyl monomer in the copolymer does not comprise an unsaturated vinyl monomer containing carboxylic acid anhydride.

As the sizing agent, one kind may be used, or two or more kinds may be used in combination.

In the copolymer that comprises as constituent units the unsaturated vinyl monomer containing carboxylic acid anhydride and the unsaturated vinyl monomer, the unsaturated vinyl monomer containing carboxylic acid anhydride is not especially limited. Examples thereof may include maleic anhydride, itaconic anhydride, citraconic anhydride and the like. Among these, maleic anhydride is preferred.

Examples of the unsaturated vinyl monomer are not especially limited, and may include styrene, α-methyl styrene, ethylene, propylene, butadiene, isoprene, chloroprene, 2,3-dichlorobutadiene, 1,3-pentadiene, cyclooctadiene, methyl methacrylate, methyl acrylate, ethyl acrylate, ethyl methacrylate and the like. Among these, styrene and butadiene are preferred.

As the copolymer that comprises as constituent units the unsaturated vinyl monomer containing carboxylic acid anhydride and the unsaturated vinyl monomer, preferred are a copolymer of maleic anhydride and butadiene, a copolymer of maleic anhydride and ethylene, and a copolymer of maleic anhydride and styrene.

The copolymer that comprises as constituent units the unsaturated vinyl monomer containing carboxylic acid anhydride and the unsaturated vinyl monomer has a weight average molecular weight of preferably 2,000 or more, and from the perspective of improving the fluidity of the polyamide composition, more preferably 2,000 to 1,000,000, and even more preferably 2,000 to 1,000,000.

In the present embodiment, weight average molecular weight can be measured by GPC.

Examples of the epoxy compound are not especially limited, and may include aliphatic epoxy compounds such as ethylene oxide, propylene oxide, butene oxide, pentene oxide, hexene oxide, heptene oxide, octene oxide, nonene oxide, decene oxide, undecene oxide, dodecene oxide, pentadecene oxide, and eicosene oxide; alicyclic epoxy compounds such as glycidol, epoxy pentanol, 1-chloro-3,4-epoxybutane, 1-chloro-2-methyl-3,4-epoxybutane, 1,4-dichloro-2,3-epoxybutane, cyclopentene oxide, cyclohexene oxide, cycloheptene oxide, cyclooctene oxide, methyl cyclohexene oxide, and vinylcyclohexene oxide, and epoxidized cyclohexene methyl alcohol; terpene-based epoxy compounds such as pinene oxide; aromatic epoxy compounds such as styrene oxide, p-chlorostyrene oxide, and m-chlorostyrene oxide; epoxidized soybean oil; epoxidized linseed oil and the like.

The polyurethane resin is not especially limited. For example, polyurethane resins that are commonly used as a sizing agent may be used. Preferred examples thereof include polyurethane resins synthesized from an isocyanate, such as m-xylylene diisocyanate (XDI), 4,4'-methylenebis(cyclohexylisocyanate) (HMDI), and isophorone diisocyanate (IPDI), and a polyester-based and a polyether-based diol.

It is preferred that the acrylic acid homopolymer (polyacrylic acid) has a weight average molecular weight of 1,000 to 90,000, and more preferably 1,000 to 25,000.

The polyacrylic acid may be in the form of a salt with a primary, secondary, or tertiary amine.

Examples of the amine are not especially limited, and may include triethylamine, triethanolamine, glycine and the like.

The "degree of neutralization" of the polyacrylic acid means the ratio of the acrylic acid component forming the salt among the acrylic acid components in the polyacrylic acid. From the perspective of improving the stability of the mixed solution with another combined-use agent (silane coupling agent etc.), and the perspective of reducing the amine smell, it is preferred that this degree of neutralization is 20 to 90%, and more preferably 40 to 60%.

It is preferred that the salt-form polyacrylic acid has a weight average molecular weight of 3,000 to 50,000. From the perspective of improving the sizing properties of the glass fiber and the carbon fiber, it is preferred that the weight average molecular weight is 3,000 or more. From the perspective of improving the mechanical properties of the polyamide composition, it is preferred that the weight average molecular weight is 50,000 or less.

The other copolymerizable monomer in the copolymer of acrylic acid and another copolymerizable monomer is not especially limited. Examples thereof may include acrylic acid, maleic acid, methacrylic acid, vinyl acetic acid, crotonic acid, isocrotonic acid, fumaric acid, itaconic acid, citraconic acid and mesaconic acid, which are monomers having a hydroxyl group and/or a carboxyl group. As this other copolymerizable monomer, it is preferred to use a monomer that is an ester of a monomer having a hydroxyl group and/or a carboxyl group.

It is preferred that this copolymer has a weight average molecular weight of 1,000 to 90,000, and more preferably 1,000 to 25,000.

The copolymer of an acrylic acid and another copolymerizable monomer may be in the form of a salt with a primary, secondary, or tertiary amine.

Examples of the amine are not especially limited, and may include triethylamine, triethanolamine, and glycine.

The "degree of neutralization" of the copolymer means the ratio of the acrylic acid component forming the salt among the copolymer acid components. From the perspective of improving the stability of the mixed solution with another combined-use agent (silane coupling agent etc.), and the perspective of reducing the amine smell, it is preferred that this degree of neutralization is 20 to 90%, and more preferably 40 to 60%.

It is preferred that the salt-form copolymer has a weight average molecular weight of 3,000 to 50,000. From the perspective of improving the sizing properties of the glass fiber and the carbon fiber, it is preferred that the weight average molecular weight is 3,000 or more. From the perspective of improving the mechanical properties of the polyamide composition, it is preferred that the weight average molecular weight is 50,000 or less.

The inorganic filler such as glass fiber and carbon fiber comprising a sizing agent can be obtained by, during a known step for producing a glass fiber or carbon fiber, continuously reacting by drying a fibrous strand produced by adding the sizing agent to the glass fiber or carbon fiber using a known method such as a roller type applicator.

During a known step for producing a glass fiber that comprises a sizing agent, this glass fiber can be obtained by drying a fibrous strand produced by adding the sizing agent to the glass fiber using a known method such as a roller type applicator.

The fibrous strand may be used as roving as is, or may be further subjected to a cutting step and used as chopped glass strands.

It is preferred to add (blend) an amount of the sizing agent corresponding to 0.2 to 3 mass % as solid content based on 100 mass % of the glass fiber and the carbon fiber, and more preferably 0.3 to 2 mass %.

From the perspective of maintaining the size of the glass fiber and the carbon fiber, it is preferred that the added amount of the sizing agent is 0.2 mass % or more as solid content based on 100 mass % of the glass fiber and the carbon fiber. From the perspective of improving the thermal stability of the polyamide composition, it is preferred that the added amount of the sizing agent is 3 mass % or less as solid content. The drying of the strands may be carried out after the cutting step, or the strands may be dried and then cut.

It is more preferred that the inorganic filler is wollastonite. Among wollastonites, it is more preferred to use in the polyamide composition a wollastonite having a number average fiber diameter of 3 to 30 μm, a weight average fiber length of 10 to 500 μm, and an aspect ratio (L/D) of 3 to 100.

As the inorganic filler, talc, mica, kaolin, silicon nitride and the like are more preferred. Even among talc, mica, kaolin, silicon nitride and the like, in the polyamide composition, those having a number average fiber diameter of 0.1 to 3 μm are even more preferred.

The method for producing the polyamide composition according to the present embodiment is not especially limited, as long as it is a method which mixes the above-described polyamide and inorganic filler.

Examples of the method for mixing the polyamide and the inorganic filler include a method for mixing the polyamide and the inorganic filler using a Henschel mixer or the like, then feeding the resultant mixture to a melt kneader and kneading, and a method for blending the inorganic filler in a polyamide turned into a melt state by a single-screw or twin-screw extruder from a side feeder.

The method for feeding the components constituting the polyamide composition can be carried out by feeding all of the constituent components (polyamide, inorganic filler and the like) all at once to the same feed opening, or by feeding from different feed openings for each constituent component.

The melt kneading temperature is preferably about 250 to 375° C. at a resin temperature.

The melt kneading time is preferably about 0.5 to 5 minutes.

The apparatus for performing the melt kneading is not especially limited. Known apparatuses, for example, a melt kneader such as a single-screw or twin-screw extruder, a Banbury mixer, and a mixing roll, may be used.

A blend amount of the inorganic filler is preferably 0.1 to 200 parts by mass, more preferably 1 to 180 parts by mass, and still more preferably 5 to 150 parts by mass, based on 100 parts by mass of the polyamide.

By setting the blend amount to 0.1 parts by mass or more, mechanical properties such as toughness, strength and rigidity of the polyamide composition improve in a good manner.

Further, by setting the blend amount to 200 parts by mass or less, a polyamide composition having excellent moldability can be obtained.

To the extent that the object of the present embodiment is not harmed, the polyamide composition may comprise additives which are customarily used in polyamides, such as a coloring agent (including a coloring master batch) like a pigment and a dye, a fire retardant, a fibrillation agent, a lubricant, a fluorescent bleaching agent, a plasticizing agent, an antioxidant, a stabilizer (including a thermal stabilizer and a light stabilizer), an ultraviolet absorber, an antistatic agent, a flow improver, a filler, a reinforcing agent, a spreading agent, a nucleating agent, rubber, a strengthening agent, and other polymers.

Further, the polyamide composition may comprise at least one kind of stabilizer selected from the group consisting of phenolic stabilizers, phosphorus stabilizers, amine stabilizers, a metal salt of an element in Group Ib, Group IIb, Group IIIa, Group IIIb, Group IVa, and Group IVb in the periodic table, and a halide of an alkali metal and an alkali earth metal.

Examples of phenolic stabilizers are not especially limited, and may include hindered phenol compounds.

The phenolic stabilizer has the property of conferring heat resistance and light fastness to a resin such as a polyamide or a fiber.

Examples of hindered phenol compounds are not especially limited, and may include N,N'-hexane-1,6-diylbis[3-(3,5-di-t-butyl-4-hydroxyphenylpropionamide), pentaerythrityl-tetrakis[3-(3,5-di-t-butyl-4-hydroxyphenyl)propionate], N,N'-hexamethylenebis(3,5-di-t-butyl-4-hydroxy-hydrocinnamamide), triethyleneglycol-bis[3-(3-t-butyl-5-methyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxapiro[5,5]undecane, 3,5-di-t-butyl-4-hydroxybenzylphosphonate-diethyl ester, 1,3,5-trimethyl-2,4,6-tris(3,5-di-t-butyl-4-hydroxybenzyl)benzene, and 1,3,5-tris(4-t-butyl-3-hydroxy-2,6-dimethylbenzyl)isocyanurate. Among these, from the perspective of improving thermal aging resistance, N,N'-hexane-1,6-diylbis[3-(3,5-di-t-butyl-4-hydroxyphenylpropionamide) is preferred.

As a phenolic stabilizer, one kind may be used, or two or more kinds may be used in combination.

When a phenolic stabilizer is used, an amount of phenolic stabilizer blended in the polyamide composition is, based on 100 parts by mass of the polyamide composition, preferably 0.01 to 1 part by mass, and more preferably 0.1 to 1 part by mass. Setting the blended amount within the above range enables thermal aging resistance to be dramatically improved, as well as allowing the amount of produced gases to be reduced.

Examples of phosphorus stabilizers are not especially limited, and may include pentaerythritol phosphite compound, trioctyl phosphite, trilauryl phosphite, tridecyl phosphite, octyldiphenyl phosphite, trisisodecyl phosphite, phenyl diisodecyl phosphite, phenyl di(tridecyl)phosphite, diphenyl isooctyl phosphite, diphenyl isodecyl phosphite, diphenyl (tridecyl)phosphite, triphenyl phosphite, tris(nonylphenyl) phosphite, tris(2,4-di-t-butylphenyl)phosphite, tris(2,4-di-t-butyl-5-methylphenyl)phosphite, tris(butoxyethyl) phosphite, 4,4'-butylidene-bis(3-methyl-6-t-butylphenyl-tetra-tridecyl)diphosphite, tetra(C12 to C15 mixed alkyl)-4,4'-isopropylidenediphenyl diphosphite, 4,4'-isopropylidenebis(2-t-butylphenyl)-di(nonylphenyl) phosphite, tris(biphenyl)phosphite, tetra(tridecyl)-1,1,3-tris (2-methyl-5-t-butyl-4-hydroxyphenyl)butane diphosphite, tetra(tridecyl)-4,4'-butylidenebis(3-methyl-6-t-butylphenyl) diphosphite, tetra(C1 to C15 mixed alkyl)-4,4'-isopropylidenediphenyl diphosphite, tris(mono-di mixed nonylphenyl)phosphite, 4,4'-isopropylidenebis(2-t-butylphenyl)-di (nonylphenyl) phosphite, 9,10-di-hydro-9-oxa-9-oxa-10-phosphorphenanthrene-10-oxide, tris(3,5-di-t-butyl-4-hydroxyphenyl)phosphite, hydrogenated-4,4'-isopropylidenediphenyl polyphosphite, bis(octylphenyl)-bis (4,4'-butylidenebis(3-methyl-6-t-butylphenyl)-1,6-hexanol diphosphite, hexamidecyl-1,1,3-tris(2-methyl-4-hydroxy-5-t-butylphenyl)diphosphite, tris(4,4'-isopropylidenebis(2-t-butylphenyl)phosphite, tris(1,3-stearoyloxyisopropyl)phosphite, 2,2-methylenebis(4,6-di-t-butylphenyl)octyl phosphite, 2,2-methylenebis(3-methyl-4,6-di-t-butylphenyl)-2-ethylhexyl phosphite, tetrakis(2,4-di-t-butyl-5-methylphenyl)-4,4'-biphenylene diphosphite, and tetrakis(2,4-di-t-butylphenyl)-4,4'-biphenylene diphosphite. Among these, from the perspective of more improving thermal aging resistance and reducing the amount of produced gases, pentaerythritol phosphite compound and tris(2,4-di-t-butylphenyl) phosphite are preferred.

Examples of pentaerythritol phosphite compounds are not especially limited, and may include 2,6-di-t-butyl-4-methylphenyl-pentaerythritol diphosphite, 2,6-di-t-butyl-4-methylphenyl-methyl-pentaerythritol diphosphite, 2,6-di-t-butyl-4-methylphenyl-2-ethylhexyl-pentaerythritol diphosphite, 2,6-di-t-butyl-4-methylphenyl-isodecyl-pentaerythritol diphosphite, 2,6-di-t-butyl-4-methylphenyl-lauryl-pentaerythritol diphosphite, 2,6-di-t-butyl-4-methylphenyl-isotridecyl-pentaerythritol diphosphite, 2,6-di-t-butyl-4-methylphenyl-stearyl-pentaerythritol diphosphite, 2,6-di-t-butyl-4-methylphenyl-cyclohexyl-pentaerythritol diphosphite, 2,6-di-t-butyl-4-methylphenyl-benzyl-pentaerythritol diphosphite, 2,6-di-t-butyl-4-methylphenyl-ethylcellosolve-pentaerythritol diphosphite, 2,6-di-t-butyl-4-methylphenyl-butylcarbitol-pentaerythritol diphosphite, 2,6-di-t-butyl-4-methylphenyl-octylphenyl-pentaerythritol diphosphite, 2,6-di-t-butyl-4-methylphenyl-nonylphenyl-pentaerythritol diphosphite, bis(2,6-di-t-butyl-4-methylphenyl)pentaerythritol diphosphite, bis(2,6-di-t-butyl-4-ethylphenyl)pentaerythritol diphosphite, 2,6-di-t-butyl-4-methylphenyl-2,6-di-t-butylphenyl-pentaerythritol diphosphite, 2,6-di-t-butyl-4-methylphenyl-2,4-di-t-butylphenyl-pentaerythritol diphosphite, 2,6-di-t-butyl-4-methylphenyl-2,4-di-t-octylphenyl-pentaerythritol diphosphite, 2,6-di-t-butyl-4-methylphenyl-2-cyclohexylphenyl-pentaerythritol diphosphite, 2,6-di-t-amyl-4-methylphenyl-phenyl-pentaerythritol diphosphite, bis(2,6-di-t-amyl-4-methylphenyl)pentaerythritol diphosphite, and bis(2,6-di-t-octyl-4-methylphenyl)pentaerythritol diphosphite. Among these, bis(2,6-di-t-butyl-4-methylphenyl)pentaerythritol diphosphite, bis(2,6-di-t-butyl-4-ethylphenyl)pentaerythritol diphosphite, bis(2,6-di-t-amyl-4-methylphenyl)pentaerythritol diphosphite, and bis(2,6-di-t-octyl-4-methylphenyl) pentaerythritol diphosphite are preferable. Bis(2,6-di-t-butyl-4-methylphenyl)pentaerythritol diphosphite is more preferable.

As the phosphorus stabilizer, one kind may be used, or two or more kinds may be used in combination.

When a phosphorus stabilizer is used, an amount of phosphorus stabilizer blended in the polyamide composition is, based on 100 parts by mass of the polyamide composition, 0.01 to 1 part by mass, and more preferably 0.1 to 1 part by mass. Setting the blended amount within the above range enables thermal aging resistance to be dramatically improved, as well as allowing the amount of produced gases to be reduced.

Examples of the amine stabilizer are not especially limited, and may include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl)-tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetramethylpiperidine, and a condensation product of 1,2,3,4-butanetetracarboxylic acid, 1,2,2,6,6-pentamethyl-4-piperidinol, and β,β,β',β'-tetramethyl-3,9-[2,4,8,10-tetraoxaspiro(5,5)undecane]diethanol.

As an amine stabilizer, one kind may be used, or two or more kinds may be used in combination.

When an amine stabilizer is used, an amount of amine stabilizer blended in the polyamide composition is, based on 100 parts by mass of the polyamide composition, preferably 0.01 to 1 part by mass, and more preferably 0.1 to 1 part by mass. Setting the blended amount within the above range enables light fastness and thermal aging resistance to be dramatically improved, as well as allowing the amount of produced gases to be reduced.

The metal salt of an element in Group Ib, Group IIb, Group IIIa, Group IIIb, Group IVa, and Group IVb in the periodic table is not especially limited. As a thermal stabilizer, a copper salt is preferred.

Examples of the copper salt are not especially limited, and may include a halogenated copper (copper iodide, copper(I) bromide, copper(II) bromide, copper(I) chloride and the like), copper acetate, copper propionate, copper benzoate, copper adipate, copper terephthalate, copper isophthalate, copper salicylate, copper nicotinate, and copper stearate; and copper complexes in which copper is coordinated to a chelating agent such as ethylenediamine and ethylenediaminetetraacetic acid. Among these, preferred is at least one kind selected from the group consisting of copper iodide, copper(I) bromide, copper(II) bromide, copper(I) chloride and copper acetate, and more preferred is copper iodide and/or copper acetate. When the above-described metal salt, especially a copper salt is used, a polyamide composition can be obtained that has excellent thermal aging resistance, and that can suppress metal corrosion of the screw or the cylinder parts (hereinafter, simply referred to as "metal corrosion") during extrusion.

As the metal salt, one kind may be used, or two or more kinds may be used in combination.

When a copper salt is used, a blend amount of the copper salt in the polyamide composition is preferably 0.01 to 0.2 parts by mass, and more preferably 0.02 to 0.15 parts by mass, based on 100 parts by mass of the polyamide composition. By setting the blend amount of the copper salt in the above-described range, thermal aging resistance improves more and copper precipitation and metal corrosion can be suppressed.

Further, from the perspective of improving thermal aging resistance, the copper element content is, based on the total polyamide composition amount, preferably 10 to 500 ppm, more preferably 30 to 500 ppm, and still more preferably 50 to 300 ppm.

Examples of the halide of the alkali metal and the alkali earth metal are not especially limited, and may include potassium iodide, potassium bromide, potassium chloride, sodium iodide and sodium chloride, and mixtures of these. Among these examples, from the perspective of improving thermal aging resistance and suppressing metal corrosion, potassium iodide, potassium bromide and combinations thereof are preferred, and potassium iodide is more preferred.

As the halide, one kind may be used, or two or more kinds may be used in combination.

When the halide of the alkali metal and the alkali earth metal are used, a blend amount of the halide of the alkali and the alkali earth metal in the polyamide composition is preferably 0.05 to 5 parts by mass, and more preferably 0.2 to 2 parts by mass, based on 100 parts by mass of the polyamide composition. By setting the blend amount of the halide in the above-described range, thermal aging resistance improves more and copper precipitation and metal corrosion can be suppressed.

It is preferred to use a mixture of the copper salt and the halide of the alkali metal and the alkali earth metal as the thermal stabilizer. It is preferred to comprise the copper salt and the halide of the alkali metal and the alkali earth metal in the polyamide composition so that the molar ratio between them (halogen/copper) is 2/1 to 40/1, and more preferably 5/1 to 30/1.

If the molar ratio (halogen/copper) is within the above range, the thermal aging resistance of the polyamide composition is dramatically improved. It is preferred that the molar ratio (halogen/copper) is 2/1 or more, because copper precipitation and metal corrosion can be suppressed. Further, if the molar ratio (halogen/copper) is 40/1 or less, the problem of corrosion of the molding machine screw and the like can be suppressed, with little harm to the mechanical properties such as toughness.

The sulfuric acid relative viscosity $\eta r$ at 25° C., the melting point Tm2, and the heat of fusion ΔH of the polyamide composition according to the present embodiment can be measured by the same methods as the measurement methods for the above-described polyamide. Further, by setting the measurement values for the polyamide composition in the same ranges as the ranges preferred for the measurement values of the above-described polyamide, a polyamide composition having excellent heat resistance, moldability, and chemical resistance can be obtained.

The polyamide and polyamide composition according to the present embodiment can be used to obtain various kinds of molded products using known molding methods, such as press molding, injection molding, gas-assisted injection molding, welding molding, extrusion, blow molding, film molding, hollow molding, multilayer molding, and melt spinning.

A molded product of the polyamide composition according to the present embodiment can be obtained using commonly known plastic molding methods, such as press molding, injection molding, gas-assisted injection molding, welding molding, extrusion, blow molding, film molding, hollow molding, multilayer molding, and melt spinning.

A molded product obtained from the polyamide and polyamide composition according to the present embodiment has excellent strength, toughness, stability under heating, durability under heating, resistance to hydrolysis, and fabricability. Therefore, the polyamide composition according to the present embodiment can be preferably used, for example, as a material for various parts, such as in automobile uses, electric and electronic parts, industrial materials, and daily and household articles. Further, the polyamide composition according to the present embodiment can be preferably used in extrusion applications.

Examples of the automobile uses are not especially limited, and may include an air intake system component, a cooling system component, a fuel system component, an interior component, an exterior component, and an electrical component.

Examples of the automobile air intake system component are not especially limited, and may include an air intake manifold, an intercooler inlet, an exhaust pipe cover, an inner bushing, a bearing retainer, an engine mount, an engine head cover, a resonator, and a slot body.

Examples of the automobile cooling system component are not especially limited, and may include a chain cover, a thermostat housing, an outlet pipe, a radiator tank, an alternator, and a delivery pipe.

Examples of the automobile fuel system component are not especially limited, and may include a fuel delivery pipe and a gasoline tank case.

Examples of the interior system component are not especially limited, and may include an instrument panel, a console box, a glove box, a steering wheel, and a trimming.

Examples of the external component are not especially limited, and may include a molding, a lamp housing, a front grill, a mud guard, a side bumper, a door mirror stay, and a roof rail.

Examples of the electrical component are not especially limited, and may include a connector, a wire harness connector, a motor component, a lamp socket, an on-board sensor switch, and a combination switch.

Examples of the electric and electronic parts are not especially limited, and may include a connector, a switch, a relay, a printed wiring board, an electronic component housing, a power point, a noise filter, a coil bobbin, and a motor end cap.

Examples of the industrial materials are not especially limited, and may include a gear, a cam, an insulation block, a valve, a power tool component, an agricultural implement component, and an engine cover.

Examples of the daily and household articles are not especially limited, and may include a button, a food container, and office equipment.

Examples of the extrusion applications are not especially limited, and may include a film, a sheet, a filament, a tube, a rod, and a hollow molded product.

EXAMPLES

The present embodiment will now be described in more detail using the following examples and comparative examples. However, the present embodiment is not limited to only these examples.

The raw materials and measurement methods used in the examples and comparative examples are shown below. In the present embodiment, 1 Kg/cm$^2$ means 0.098 MPa.
Raw Materials
The following compounds were used in the examples.
(a) Dicarboxylic Acid
(1) 1,4-Cyclohexanedicarboxylic acid (CHDA), trade name 1,4-CHDA HP Grade (trans/cis (molar ratio)=25/75), manufactured by Eastman Chemical Company
(2) Terephthalate acid (TPA), trade name Terephthalate acid, manufactured by Wako Pure Chemical Industries, Ltd.
(3) Adipic acid (ADA), trade name Adipic acid, manufactured by Wako Pure Chemical Industries, Ltd.
(4) Dodecanedioic acid (C12DA), trade name Dodecanedioic acid, manufactured by Wako Pure Chemical Industries, Ltd.
(b) Diamine
(5) 2-Methylpentamethylenediamine (2 MPD), trade name 2-Methyl-1,5-diaminopentane, manufactured by Tokyo Chemical Industry Co., Ltd.
(6) Pentamethylenediamine (PMD), trade name 1,5-diaminopentane, manufactured by Wako Pure Chemical Industries, Ltd.
(7) Hexamethylenediamine (HMD), trade name Hexamethylenediamine, manufactured by Wako Pure Chemical Industries, Ltd.
(c) Lactam and/or Aminocarboxylic Acid
(8) ε-caprolactam (CPL), trade name ε-caprolactam, manufactured by Wako Pure Chemical Industries, Ltd.
(B) Inorganic Filler
(9) Glass fiber (GF), trade name ECS03T275H, average fiber diameter (average particle size) 10 μm (circularity), cut length 3 mm, manufactured by Nippon Electric Glass Co., Ltd.
(10) Wollastonite, trade name NYAD 400, average fiber diameter (average particle size) of 7 μm, average fiber length of 35 μm, manufactured by NYCO
(11) Formic acid, trade name Gisan, manufactured by Wako Pure Chemical Industries, Ltd.
Amount of Polyamide Component Calculation The mol % of the (a-1) alicyclic dicarboxylic acid was determined by calculating the (number of moles of the (a-1) alicyclic dicarboxylic acid added as a raw material monomer/number of moles of all the (a) dicarboxylic acid added as a raw material monomer)×100.

The mol % of the (b-1) diamine having the pentamethylenediamine skeleton was determined by calculating the (number of moles of the (b-1) diamine having the pentamethylenediamine skeleton added as a raw material monomer/number of moles of all the (b) diamine added as a raw material monomer)×100.

The mol % of the (c) lactam and/or aminocarboxylic acid was determined by calculating the (number of moles of the (c) lactam and/or aminocarboxylic acid added as a raw material monomer/number of moles of all the (a) dicarboxylic acid+ number of moles of all the (b) diamine+number of moles of the (c) lactam and/or aminocarboxylic acid added as raw material monomers)×100.

When performing the calculation based on the above formula, the number of moles of the (b-1) diamine having the pentamethylenediamine skeleton added as an additive during melt polymerization was not comprised in the denominator or the numerator.
Measurement Methods
(1) Melting Points Tm1, Tm2 (° C.)

Melting points Tm1, Tm2 were measured using the Diamond-DSC, manufactured by PerkinElmer Inc., based on JIS-K7121. Measurement was carried out under conditions of a nitrogen atmosphere, by taking Tm1 (° C.) as the temperature at the endothermic peak (melting peak) which appeared when the temperature of a specimen of about 10 mg was increased to 300 to 350° C. depending on the melting point of the sample at a rate of temperature increase of 20° C./min. Tm2 was taken as the temperature of the maximum peak temperature of the endothermic peaks (melting peaks) which appeared when, after maintaining the temperature in a melt state at the maximum temperature for 2 minutes, lowering the temperature to 30° C. at a rate of temperature decrease of 20° C./min and then similarly increasing the temperature at a rate of temperature increase of 20° C./min. The total peak area was taken as the heat of fusion ΔH (J/g). In cases where there was a plurality of peaks as Tm2, peaks having a ΔH of 1 J/g or more were determined to be peaks. If there are two peaks as Tm2, for example, one at a melting point of 295° C., ΔH=20 J/g, and another one at a melting point of 325° C., ΔH=5 J/g, the melting point was taken to be 325° C., ΔH=25 J/g.
(2) Sulfuric Acid Relative Viscosity ηr at 25° C.

Measurement of the relative viscosity at 25° C. was carried out based on JIS-K6920. More specifically, using 98% sulfuric acid, a polymer solution (ratio of (polyamide 1 g)/(98% sulfuric acid 100 mL)) was prepared, and the relative viscosity was measured under temperature conditions of 25° C.
(3) Formic Acid Relative Viscosity VR at 25° C.

Measurement of the formic acid relative viscosity at 25° C. was carried out based on JIS-K6920. Using 90% formic acid, a polymer solution (ratio of (5.5 g of polyamide/50 mL of 90% formic acid)) was prepared, and the formic acid relative viscosity was measured under temperature conditions of 25° C.
(4) Cyclic Amino End Amount (μ equivalents/g)

The cyclic amino end amount was measured using $^1$H-NMR.

The cyclic amino end amount was calculated using the integral ratio between the signal (chemical shift value 3.5 to 4.0 ppm) of the hydrogen bonded to the carbon adjacent to the nitrogen atom of a nitrogen heterocycle and the signal (chemical shift value 3.0 to 3.5 ppm) of the hydrogen bonded to the carbon adjacent to the nitrogen atom of the amide bond in the polyamide main chain. The total end number of the polymer ends that was used during this calculation was calculated as $2/Mn \times 1,000,000$ using Mn measured by GPC (HLC-8020, hexafluoropropanol solvent, based on a PMMA standard sample (manufactured by Polymer Laboratories), manufactured by Tosoh Corporation).
(5) Amino End Amount (μ Equivalents/g)

The amino end amount was measured by neutralization titration.

3.0 g of polyamide was dissolved in 100 mL of an aqueous 90% phenol solution. Titration was carried out using 0.025 N hydrochloric acid to determine the amino end amount. The endpoint was determined from the indicated value on a pH meter.
(6) ηr Maintenance Ratio at Dwell A test piece was injection molded with a dwell time in the screw of 6 minutes (average value) by adjusting the cooling period when obtaining a multipurpose test piece (A type) from polyamide pellets.

The ηr of the 6-minute dwell time test piece was measured by the method described in (2), and the relative value when the ηr of the polyamide pellets was 100 was taken as the ηr maintenance ratio at dwell.
(7) VR Maintenance Ratio at Dwell A molded piece was obtained as an ISO 3167 multipurpose test piece (A type) from the polyamide pellets obtained in the examples and comparative examples using the injection molding machine PS-40E (manufactured by Nissei Plastic Industrial Co., Ltd.). The injection molding conditions were set to injection+pressure holding time of 25 seconds, a cooling time of 95 seconds, a die temperature of 120° C., and a cylinder temperature of 345° C. The dwell time in the screw was 6 minutes (average value).

The VR of the 6-minute dwell time test piece was measured by the method described in (3), and the relative value when the VR of the polyamide pellets was 100 was taken as the VR maintenance ratio at dwell.

(8) Tensile Strength (MPa) and Tensile Elongation (%)

A molded piece was obtained as an ISO 3167 multipurpose test piece (A type) from the polyamide pellets or the polyamide composition pellets obtained in the examples and comparative examples using the injection molding machine PS-40E (manufactured by Nissei Plastic Industrial Co., Ltd.) with the injection+pressure holding time set to 25 seconds, the cooling time set to 15 seconds, the die temperature set to Tg+20° C., and the cylinder temperature set to (Tm2+10)° C. to (Tm2+30)° C. The dwell time in the screw was 2 minutes (average value).

Using the obtained multipurpose test piece (A type), the tensile strength was measured by performing a tensile test based on ISO 527 at a tension rate of 50 mm/min or 5 mm/min.

Further, the tensile elongation (%) was determined by the following formula as the ratio of the amount of displacement between chucks at fracture to the pre-test initial inter-chuck distance.

Tensile elongation(%)=100×fracture displacement/ initial distance between chucks The glass transition temperature was measured using the Diamond-DSC, manufactured by PerkinElmer Inc., based on JIS-K7121. Measurement was carried out under conditions of using liquid nitrogen to rapidly cool a molten sample obtained by melting a specimen with a hot stage (EP80, manufactured by Mettler) to solidify the sample for use as a measurement sample. Using 10 mg of this sample, the temperature was increased to a range of 30 to 350° C. at a rate of temperature increase of 20° C./min, and the glass transition temperature was measured.
(9) Creep Fracture Stress (MPs)

Using the polyamide composition pellets obtained in the examples and comparative examples, a plate-like molded piece was molded (150×150×4 mm) under the same injection molding conditions as in (8).

A measurement sample was produced by cutting a test piece from the obtained plate-like molding based on ASTM D1822 so that the resin filling direction and the test piece evaluation direction were orthogonal to each other.

The measurement sample was subjected to a load arbitrarily set in the range of 60 to 90% of its tensile strength under a 130° C. atmosphere using a Six-Sample Creep tester, manufactured by Yasuda Seiki Seisakusho Ltd (Model 145-PC). A logarithmic approximation of a measurement point plotted from the time taken until fracture as a function of the load stress at that time was used to determine the stress value at which fracture occurred at a stress load time of 24 hours.

Using creep fracture stress as an index for durability under heating, a higher stress value indicates better creep properties.
(10) Tensile Strength Retention Rate after Dipping (%)

The multipurpose test piece (A type) obtained by the method in the above item (8) of a polyamide composition was dipped for 24 hours and 720 hours in a 130° C. aqueous solution of 50% ethylene glycol. After leaving at room temperature, the tensile test method of the above item (8) was carried out to measure tensile strength.

The ratio (tensile strength retention rate after dipping) of the tensile strength measured after 720 hours of dipping to the tensile strength measured after 24 hours of dipping was determined as an index of resistance to hydrolysis.
(11) Number of Foreign Particles Due to Die-Lip Buildup (Number/5 kg)

5 kg of the polyamide pellets obtained in the examples and the comparative examples was spread over a metal bat, and the number of foreign particles due to die-lip buildup was visually counted. This number served as an index of fabricability.

(12) Color Tone

The b value of the polyamide pellets obtained in the examples and the comparative examples was measured using the Colorimeter ZE-2000 manufactured by Nippon Denshoku Industries Co., Ltd. Specifically, the above-described pellet sample was pressed out to a thickness of 13 mm using a purpose-built jig, and the color tone was measured by projecting light from a 10 mm φ opening.

Example 1

A polyamide polymerization reaction was carried out by "hot melt polymerization".

896 g (5.20 mol) of (a) CHDA and 604 g (5.20 mol) of (b) 2 MPD were dissolved in 1,500 g of distilled water to produce 50 mass % aqueous solution containing an equimolar raw material monomers.

The obtained aqueous solution and 21 g of 2MPD (0.18 mol) as the additives added during melt polymerization was charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen. Heating was continued from a solution temperature of about 50° C. until the pressure in the autoclave tank was, in terms of gauge pressure (in the following, pressure in the tank is always expressed as gauge pressure), about 2.5 kg/cm². While removing water from the system to maintain the pressure in the tank at about 2.5 kg/cm², heating was continued so that the concentration of the aqueous solution was concentrated to about 85%. Removal of water was stopped, and then heating was continued until the pressure in the tank was about 30 kg/cm². While removing water from the system to maintain the pressure in the tank at about 30 kg/cm², heating was continued until 50° C. below the final temperature. While continuing heating, the pressure in the tank was lowered over 60 minutes from 30 kg/cm² to atmospheric pressure (gauge pressure of 0 kg/cm²). The heater temperature was adjusted so that the final temperature of the solution would be 345° C. With the solution temperature in that state, the tank contents were kept for 10 minutes under a reduced pressure of 100 Torr by a vacuum apparatus. Then, the pressure was increased with nitrogen, and the resultant resin was formed into a strand from a lower spinneret (nozzle). This strand was water cooled and cut, then discharged in pellet form to obtain a polyamide.

Table 3 shows the measurement results obtained by, after adjusting the moisture content to about 0.2 mass % by drying the obtained polyamide under a nitrogen flow, performing the measurements of the above items (1) to (8). The tension rate in the tensile test was 50 mm/min. Further, the polyamide b value was 1.4.

Example 2

Polyamide polymerization was carried out by the hot melt polymerization method described in Example 1, except that the amount of the additives added during melt polymerization was as shown in Table 1.

Further, "solid phase polymerization" was also carried out.

10 kg of the polyamide pellets obtained by the melt polymerization was charged into a conical ribbon vacuum dryer (Model name: Ribocone RM-10V, manufactured by Okawara Corporation), and the contents of the dryer were thoroughly purged with nitrogen. Under a 1 L/minute nitrogen flow, the pellets were heated at 260° C. for 6 hours while stirring. Then, while continuing to flow with nitrogen, the temperature was decreased. When the temperature reached about 50° C., the pellets were removed as is from the dryer to obtain a polyamide.

Table 3 shows the measurement results obtained by performing the above-described measurement methods on the obtained polyamide. The tension rate in the tensile test was 50 mm/min. Further, the polyamide b value was 1.6.

Example 3

Polyamide polymerization was carried out by the hot melt polymerization method described in Example 1, except that the time for the pressure in the tank to decrease from 30 kg/cm² to atmospheric pressure was set at 90 minutes. Table 3 shows the measurement results obtained by performing the above-described measurement methods on the obtained polyamide. The tension rate in the tensile test was 50 mm/min. Further, the polyamide b value was 2.6.

Examples 4 to 9

As the (a) dicarboxylic acid, the (b) diamine, the (c) lactam and/or aminocarboxylic acid, and the additives added during melt polymerization used in Example 1, the compounds and their amounts shown in Table 1 were used.

Polyamide polymerization was carried out by the hot melt polymerization method described in Example 1, except that the melt polymerization final temperature was set to that shown in Table 1. Further, solid phase polymerization was carried out in the manner described in Example 2, except that the solid phase polymerization temperature and time were changed to those shown in Table 1.

Table 3 shows the measurement results obtained by performing the above-described measurement methods on the obtained polyamide. The tension rate in the tensile test was 50 mm/min.

Comparative Example 1

Polyamide polymerization was carried out by the hot melt polymerization method described in Example 1, except that the time for the pressure in the tank to decrease from 30 kg/cm² to atmospheric pressure was set at 120 minutes, and that the melt polymerization final temperature was set at 350° C. Table 4 shows the measurement results obtained by performing the above-described measurement methods on the obtained polyamide. The tension rate in the tensile test was 50 mm/min. Further, the polyamide b value was 3.2.

Comparative Example 2

As the (a) dicarboxylic acid, the (b) diamine, and the additives added during melt polymerization used in Example 1, the compounds and their amounts shown in Table 2 were used.

Polyamide polymerization was carried out by the hot melt polymerization method described in Example 1, except that the melt polymerization final temperature was set to that shown in Table 2. Further, solid phase polymerization was carried out in the manner described in Example 2, except that the solid phase polymerization temperature and time were changed to those shown in Table 2.

Table 4 shows the measurement results obtained by performing the above-described measurement methods on the obtained polyamide. The tension rate in the tensile test was 50 mm/min.

Comparative Examples 3 to 7

As the (a) dicarboxylic acid, the (b) diamine, and the additives added during melt polymerization used in Example 1, the compounds and their amounts shown in Table 2 were used.

Polyamide polymerization was carried out by the hot melt polymerization method described in Example 1, except that the melt polymerization final temperature was set to that shown in Table 2. Table 4 shows the measurement results obtained by performing the above-described measurement methods on the obtained polyamide. The tension rate in the tensile test was 50 mm/min.

Example 10

The polyamide obtained in Example 1 was used by drying under a nitrogen flow so that the moisture content was adjusted to about 0.2 mass %. Using a twin-screw extruder (TEM 35, L/D=47.6, (D=37 mm φ), set temperature Tm2+ 20° C. (in this case, 327+20=347° C.), screw revolution speed 300 rpm, manufactured by Toshiba Machine Co., Ltd.), this dried polyamide (100 parts by mass) was fed from a top feed opening provided at the uppermost upstream portion of the extruder. Glass fiber was fed as an inorganic filler in the ratio shown in Table 5 (parts by mass) from a side feed opening on a downstream side of the extruder (the resin fed from the top feed opening was in a sufficiently molten state). A melt kneaded product extruded from a die head was cooled in a strand form, which was pelletized to form polyamide composition.

Table 5 shows the measurement results of the above-described (8) to (11) carried out on the obtained polyamide composition. The tension rate in the tensile test was 5 mm/min.

Examples 11 to 20

A polyamide composition was obtained in the same manner as in Example 10, except that the raw material components were added in the amounts shown in Table 5. Table 5 shows the measurement results obtained by performing the above-described measurement methods on the polyamide composition. The tension rate in the tensile test was 5 mm/min.

Comparative Examples 8 to 14

A polyamide composition was obtained in the same manner as in Example 10, except that the raw material components were added in the amounts shown in Table 6. Table 6 shows the measurement results obtained by performing the above-described measurement methods on the polyamide composition. The tension rate in the tensile test was 5 mm/min.

TABLE 1

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| Polyamide Component Content | (a) Dicarboxylic Acid | Type | CHDA | CHDA | CHDA | CHDA | CHDA | CHDA | CHDA | CHDA | CHDA |
|  |  | g | 896 | 896 | 896 | 689 | 896 | 469 | 852 | 494 | 862 |
|  |  | mol | 5.20 | 5.20 | 5.20 | 4.00 | 5.20 | 2.72 | 4.95 | 2.87 | 5.01 |
|  |  | Type |  |  |  | C12DA |  | ADA | TPA | ADA |  |
|  |  | g |  |  |  | 230 |  | 398 | 43 | 419 |  |
|  |  | mol |  |  |  | 1.00 |  | 2.72 | 0.26 | 2.87 |  |
|  | (b) Diamine | Type | 2MPD | 2MPD | 2MPD | 2MPD | 2MPD | 2MPD | 2MPD | PMD | 2MPD |
|  |  | g | 604 | 604 | 604 | 581 | 484 | 316 | 605 | 586 | 582 |
|  |  | mol | 5.20 | 5.20 | 5.20 | 5.00 | 4.16 | 2.72 | 5.21 | 5.74 | 5.01 |
|  |  | Type |  |  |  |  | HMD | HMD |  |  |  |
|  |  | g |  |  |  |  | 121 | 316 |  |  |  |
|  |  | mol |  |  |  |  | 1.04 | 2.72 |  |  |  |
|  | (c) Lactam and/or Aminocarboxylic Acid | Type |  |  |  |  |  |  |  |  | CPL |
|  |  | g |  |  |  |  |  |  |  |  | 57 |
|  |  | mol |  |  |  |  |  |  |  |  | 0.50 |
| Polymerization Conditions | Additives Added During Hot Melt Polymerization | Type | 2MPD | 2MPD | 2MPD | 2MPD | 2MPD | 2MPD | 2MPD | MPD | 2MPD |
|  |  | g | 21 | 21 | 6 | 14 | 15 | 4 | 21 | 18 | 20 |
|  |  | mol | 0.18 | 0.18 | 0.05 | 0.12 | 0.12 | 0.04 | 0.18 | 0.17 | 0.18 |
|  | Melt Polymerization Final Temperature | ° C. | 345 | 345 | 345 | 305 | 345 | 305 | 355 | 355 | 340 |
|  | Solid Phase Polymerization Temperature | ° C. | None | 260 | None | 240 | 240 | 240 | 240 | 240 | 260 |
|  | Solid Phase Polymerization Time | h |  | 6 |  | 12 | 12 | 12 | 12 | 12 | 6 |

TABLE 2

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Polyamide Component Content | (a) Dicarboxylic Acid | Type | CHDA | CHDA | CHDA | CHDA |  |  | CHDA |
|  |  | g | 896 | 557 | 813 | 808 |  |  | 287 |
|  |  | mol | 5.20 | 3.24 | 4.72 | 4.69 |  |  | 1.67 |
|  |  | Type |  | ADA | ADA | TPA | TPA | ADA | ADA |
|  |  | g |  | 315 | 77 | 87 | 883 | 883 | 568 |
|  |  | mol |  | 2.16 | 0.52 | 0.52 | 5.31 | 6.04 | 3.89 |

TABLE 2-continued

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| | (b) Diamine | Type | 2MPD | 2MPD | 2MPD | 2MPD | 2MPD | PMD | 2MPD |
| | | g | 604 | 219 | 244 | 606 | 370 | 617 | 323 |
| | | mol | 5.20 | 1.89 | 2.10 | 5.21 | 3.19 | 6.04 | 2.78 |
| | | Type | | HMD | HMD | | HMD | | HMD |
| | | g | | 408 | 366 | | 247 | | 323 |
| | | mol | | 3.51 | 3.15 | | 2.13 | | 2.78 |
| | (c) Lactam and/or Aminocarboxylic Acid | Type | | | | | | | |
| | | g | | | | | | | |
| | | mol | | | | | | | |
| Polymerization Conditions | Additives Added During Hot Melt Polymerization | Type | 2MPD | 2MPD | 2MPD | 2MPD | 2MPD | MPD | 2MPD |
| | | g | 15 | 3 | 7 | 21 | 11 | 9 | 7 |
| | | mol | 0.13 | 0.03 | 0.06 | 0.18 | 0.10 | 0.09 | 0.06 |
| | | Type | | | | | Formic Acid | | |
| | | g | | | | | 48 | | |
| | | mol | | | | | 1.04 | | |
| | Melt Polymerization Final Temperature | °C. | 350 | 300 | 365 | 330 | 340 | 270 | 280 |
| | Solid Phase Polymerization Temperature | °C. | None | 240 | None | None | None | None | None |
| | Solid Phase Polymerization Time | h | | 12 | | | | | |

TABLE 3

|  |  |  | Example 1 | Example 2 | Example 3 | Example 4 | Example 5 | Example 6 | Example 7 | Example 8 | Example 9 |
|---|---|---|---|---|---|---|---|---|---|---|---|
| (a) Dicarboxylic Acid | | Type | CHDA | CHDA | CHDA | CHDA | CHDA | CHDA | CHDA | CHDA | CHDA |
| | | Mol % in (a) | 100 | 100 | 100 | 80 | 100 | 50 | 95 | 50 | 100 |
| | | Type | — | — | — | C12DA | — | ADA | TPA | ADA | — |
| | | Mol % in (a) | — | — | — | 20 | — | 50 | 5 | 50 | — |
| (b) Diamine | | Type | 2MPD | 2MPD | 2MPD | 2MPD | 2MPD | 2MPD | 2MPD | PMD | 2MPD |
| | | Mol % in (b) | 100 | 100 | 100 | 100 | 80 | 50 | 100 | 100 | 100 |
| | | Type | — | — | — | 0 | HMD | HMD | — | — | — |
| | | Mol % in (b) | — | — | — | 0 | 20 | 50 | — | — | — |
| Mol % of [(a) + (b)] in [(a) + (b) + (c)] | | | 100 | 100 | 100 | 100 | 100 | 100 | 100 | 100 | 95.2 |
| (c) Lactam and/or Aminocarboxylic Acid | | Type | — | — | — | — | — | — | — | — | CPL |
| Mol % of (c) in [(a) + (b) + (c)] | | | — | — | — | — | — | — | — | — | 4.8 |
| Melting Point Tm2 | | °C. | 327 | 331 | 327 | 285 | 323 | 275 | 335 | 334 | 321 |
| Sulfuric Acid Relative Viscosity ηr at 25° C. | | | 2.5 | 3.2 | 2.2 | 3.0 | 3.0 | 2.9 | 3.0 | 3.1 | 3.1 |
| Cyclic Amino End Amount | | μ equivalents/g | 40 | 38 | 53 | 37 | 35 | 32 | 41 | 38 | 36 |
| Amino End Amount | | μ equivalents/g | 50 | 22 | 14 | 40 | 43 | 50 | 32 | 28 | 25 |
| Polyamide Properties | Tensile Strength | MPa | 106 | 116 | 97 | 110 | 108 | 112 | 108 | 111 | 113 |
| | Tensile Elongation | % | 8 | 14 | 6 | 12 | 12 | 13 | 11 | 13 | 14 |
| | ηr Maintenance Ratio at Dwell | % | 78 | 87 | 77 | 81 | 83 | 82 | 81 | 83 | 83 |
| | VR Maintenance Ratio at Dwell | % | 75 | 85 | 72 | 80 | 84 | 83 | 79 | 81 | 79 |

TABLE 4

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| (a) Dicarboxylic Acid | | Type | CHDA | CHDA | CHDA | CHDA | — | — | CHDA |
| | | Mol % in (a) | 100 | 60 | 90 | 90 | — | — | 30 |
| | | Type | — | ADA | ADA | TPA | TPA | ADA | ADA |
| | | Mol % in (a) | — | 40 | 10 | 10 | 100 | 100 | 70 |

TABLE 4-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| (b) Diamine | Type | 2MPD | 2MPD | 2MPD | 2MPD | 2MPD | PMD | 2MPD |
|  | Mol % in (b) | 100 | 35 | 40 | 100 | 60 | 100 | 50 |
|  | Type | — | HMD | HMD | — | HMD | — | HMD |
|  | Mol % in (b) | — | 65 | 60 | — | 40 | — | 50 |
| Mol % of [(a) + (b)] in [(a) + (b) + (c)] |  | 100 | 100 | 100 | 100 | 100 | 100 | 100 |
| (c) Lactam and/or Aminocarboxylic Acid | Type | — | — | — | — | — | — | — |
| Mol % of (c) in [(a) + (b) + (c)] |  | — | — | — | — | — | — | — |
| Melting Point Tm2 | °C. | 327 | 280 | 341 | 308 | 310 | 254 | 265 |
| Sulfuric Acid Relative Viscosity ηr at 25° C. |  | 2.1 | 2.8 | 2.5 | 2.2 | 2.2 | 3.1 | 2.7 |
| Cyclic Amino End Amount | μ equivalents/g | 64 | 28 | 39 | 70 | 25 | 9 | 14 |
| Amino End Amount | μ equivalents/g | 22 | 64 | 43 | 53 | 58 | 30 | 58 |
| Polyamide Properties | Tensile Strength MPa | 89 | 90 | 106 | 88 | 85 | 90 | 92 |
|  | Tensile Elongation % | 5 | 5 | 10 | 5 | 4 | 19 | 10 |
|  | ηr Maintenance Ratio at Dwell % | 79 | 77 | 73 | 79 | 75 | 78 | 74 |
|  | VR Maintenance Ratio at Dwell % | 55 | 65 | — | 56 | — | 55 | 50 |

TABLE 5

|  |  | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| Polyamide Production Method |  | Example 1 | Example 2 | Example 3 | Example 4 | Example 5 | Example 6 | Example 7 | Example 8 | Example 9 | Example 2 | Example 2 |
| (a) Dicarboxylic Acid | Type | CHDA | CHDA | CHDA | CHDA | CHDA | CHDA | CHDA | CHDA | CHDA | CHDA | CHDA |
|  | Mol % in (a) | 100 | 100 | 100 | 80 | 100 | 50 | 95 | 50 | 100 | 100 | 100 |
|  | Type | — | — | — | C12DA | — | ADA | TPA | ADA | — | — | — |
|  | Mol % in (a) | — | — | — | 20 | — | 50 | 5 | 50 | — | — | — |
| (b) Diamine | Type | 2MPD | 2MPD | 2MPD | 2MPD | 2MPD | 2MPD | 2MPD | 2MPD | PMD | 2MPD | 2MPD |
|  | Mol % in (b) | 100 | 100 | 100 | 100 | 80 | 50 | 100 | 100 | 100 | 100 | 100 |
|  | Type | — | — | — | 0 | HMD | HMD | — | — | — | — | — |
|  | Mol % in (b) | — | — | — | 0 | 20 | 50 | — | — | — | — | — |
| Mol % of [(a) + (b)] in [(a) + (b) + (c)] |  | 100 | 100 | 100 | 100 | 100 | 100 | 100 | 100 | 95.2 | 100 | 100 |
| (c) Lactam and/or Aminocarboxylic Acid | Type | — | — | — | — | — | — | — | — | CPL | — | — |
| Mol % of (c) in [(a) + (b) + (c)] |  | — | — | — | — | — | — | — | — | 4.8 | — | — |
| <Composition> |  |  |  |  |  |  |  |  |  |  |  |  |
| Polyamide | parts by mass | 100 | 100 | 100 | 100 | 100 | 100 | 100 | 100 | 100 | 100 | 100 |
| GF | parts by mass | 100 | 100 | 100 | 100 | 100 | 100 | 100 | 100 | 100 | 50 | 80 |
| Wollastonite | parts by mass |  |  |  |  |  |  |  |  |  | 50 | 20 |
| <Properties> |  |  |  |  |  |  |  |  |  |  |  |  |
| Tensile Strength | MPa | 251 | 265 | 229 | 260 | 255 | 265 | 255 | 262 | 267 | 228 | 260 |
| Creep Fracture Stress | MPa | 60 | 67 | 46 | 60 | 67 | 55 | 59 | 52 | 60 | 63 | 65 |
| Tensile Strength Retention Rate After Dipping | % | 75 | 81 | 78 | 76 | 81 | 72 | 75 | 74 | 71 | 75 | 78 |
| Number of Foreign Particles due to Die-lip Buildup | number/5 kg | 3 | 2 | 6 | 3 | 2 | 3 | 5 | 6 | 4 | 2 | 3 |

TABLE 6

|  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Polyamide Production Method | Comparative Example 1 | Comparative Example 2 | Comparative Example 3 | Comparative Example 4 | Comparative Example 5 | Comparative Example 6 | Comparative Example 7 |

TABLE 6-continued

| | | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
| (a) Dicarboxylic Acid | Type | CHDA | CHDA | CHDA | CHDA | — | — | CHDA |
| | Mol % in (a) | 100 | 60 | 90 | 90 | — | — | 30 |
| | Type | — | ADA | ADA | TPA | TPA | ADA | ADA |
| | Mol % in (a) | — | 40 | 10 | 10 | 100 | 100 | 70 |
| (b) Diamine | Type | 2MPD | 2MPD | 2MPD | 2MPD | 2MPD | PMD | 2MPD |
| | Mol % in (b) | 100 | 35 | 40 | 100 | 60 | 100 | 50 |
| | Type | — | HMD | HMD | — | HMD | — | HMD |
| | Mol % in (b) | — | 65 | 60 | — | 40 | — | 50 |
| Mol % of [(a) + (b)] in [(a) + (b) + (c)] | | 100 | 100 | 100 | 100 | 100 | 100 | 100 |
| (c) Lactam and/or Aminocarboxylic Acid | Type | — | — | — | — | — | — | — |
| Mol % of (c) in [(a) + (b) + (c)] | | — | — | — | — | — | — | — |
| <Composition> | | | | | | | | |
| Polyamide | parts by mass | 100 | 100 | 100 | 100 | 100 | 100 | 100 |
| GF | parts by mass | 100 | 100 | 100 | 100 | 100 | 100 | 100 |
| Wollastonite | parts by mass | | | | | | | |
| <Properties> | | | | | | | | |
| Tensile Strength | MPa | 210 | 213 | 251 | 208 | 201 | 235 | 229 |
| Creep Fracture Stress | MPa | 48 | 39 | 36 | 46 | 45 | 36 | 41 |
| Tensile Strength Retention Rate After Dipping | % | 77 | 61 | 62 | 78 | 60 | 58 | 61 |
| Number of Foreign Particles due to Die-lip Buildup | number/5 kg | 7 | 12 | 4 | 10 | 7 | 9 | 8 |

As is clear from the results of Table 3, the polyamides of Examples 1 to 9 had a high melting point and excellent properties for each of strength, toughness, and stability under heating. Among these polyamides, the polyamides of Examples 1, 2, and 4 to 9, which had a sulfuric acid relative viscosity ηr of 2.3 or more, had especially excellent properties.

In contrast, Comparative Examples 1 and 4, which had a cyclic amino end amount exceeding 60μ equivalents/g, were insufficient in terms of strength, toughness, and stability under heating. Further, Comparative Examples 2 and 5 to 7, which had a cyclic amino end amount of less than 30μ equivalents/g, were also insufficient in terms of strength, toughness, and stability under heating.

As is clear from the results of Table 5, the polyamide compositions of Examples 10 to 20 had excellent properties in terms of strength, durability under heating, resistance to hydrolysis, and fabricability. In contrast, the polyamide compositions of Comparative Examples 8 to 14 were insufficient in terms of these. Further, Comparative Examples 5 and 12, which were produced by the method described in Patent Document 6, were insufficient in terms of strength, toughness, durability under heating, resistance to hydrolysis, and fabricability.

Comparative Examples 6 and 13, which were produced by the methods described in Patent Documents 7 and 8, not only had insufficient strength, stability under heating, durability under heating, resistance to hydrolysis, and fabricability, but also had a low melting point.

Example 21

10 kg of the polyamide pellets obtained in Example 1 was charged into a conical ribbon vacuum dryer (Model name: Ribocone RM-10V, manufactured by Okawara Corporation), and the contents of the dryer were thoroughly purged with nitrogen. Under a 1 L/minute nitrogen flow, the pellets were heated at 220° C. for 10 hours while stirring to carry out solid phase polymerization. Then, while continuing to flow with nitrogen, the temperature was decreased. When the temperature reached about 50° C., the pellets were removed as is from the dryer to obtain a polyamide. The sulfuric acid relative viscosity ηr of the obtained pellets was 3.4, and the increase in ηr was 0.9.

Comparative Example 15

Solid phase polymerization was carried out in the same manner as in Example 21, except that the polyamide pellets obtained in Comparative Example 1 were used. The sulfuric acid relative viscosity ηr of the obtained pellets was 2.5, and the increase in ηr was 0.4.

Comparative Example 16

Solid phase polymerization was carried out in the same manner as in Example 21, except that the polyamide pellets obtained in Comparative Example 4 were used. The sulfuric acid relative viscosity ηr of the obtained pellets was 2.7, and the increase in ηr was 0.5.

As can be seen from Example 21, and Comparative Examples 15 and 16, it was confirmed that polyamides having a cyclic amino end amount of 60μ equivalents/g or less have a rapid solid phase polymerization rate and excellent productivity.

The present application is based on a Japanese patent application filed on Sep. 11, 2009 (Japanese Patent Application No. 2009-210853), whose contents are hereby incorporated by reference herein.

INDUSTRIAL APPLICABILITY

According to the present invention, a polyamide can be provided having a high melting point, which has excellent strength, toughness, and stability under heating. Further, the present invention can also provide a polyamide composition that has the excellent properties of the polyamide, as well as excellent durability under heating, resistance to hydrolysis, and fabricability.

The polyamide and polyamide composition according to the present invention has industrial applicability, and can for example be preferably used as a molding material for various parts, such as in automobiles, electric and electronics, industrial materials, and daily and household articles, and extrusion application.

The invention claimed is:

1. A polyamide obtained by polymerizing
   an (a) dicarboxylic acid comprising at least 50 mol % of an alicyclic dicarboxylic acid and
   a (b) diamine comprising at least 50 mol % of a diamine having a pentamethylenediamine skeleton, wherein
   the polyamide has a cyclic amino end amount of 30 to 60μ equivalents/g.

2. The polyamide according to claim 1, wherein the polyamide has a sulfuric acid relative viscosity ηr at 25° C. of 2.3 or more.

3. The polyamide according to claim 1, wherein the polyamide has an amino end amount of 20μ equivalents/g or more.

4. The polyamide according to claim 1, wherein the polyamide is obtained by polymerizing at a reaction temperature exceeding 300° C.

5. The polyamide according to claim 1, wherein the cyclic amino end is produced by a cyclization reaction of a diamine having a pentamethylenediamine skeleton.

6. The polyamide according to claim 1, wherein the polyamide is obtained by carrying out a solid phase polymerization step in at least a part of the polymerization process.

7. A polyamide composition comprising the polyamide according to claim 1 and an inorganic filler.

8. The polyamide according to claim 2, wherein the polyamide has an amino end amount of 20μ equivalents/g or more.

9. The polyamide according to claim 2, wherein the polyamide is obtained by polymerizing at a reaction temperature exceeding 300° C.

10. The polyamide according to claim 2, wherein the cyclic amino end is produced by a cyclization reaction of a diamine having a pentamethylenediamine skeleton.

11. The polyamide according to claim 2, wherein the polyamide is obtained by carrying out a solid phase polymerization step in at least a part of the polymerization process.

12. A polyamide composition comprising the polyamide according to claim 2 and an inorganic filler.

* * * * *